United States Patent
Trainor, Jr. et al.

(10) Patent No.: US 11,890,965 B2
(45) Date of Patent: Feb. 6, 2024

(54) VEHICLE CONTROL SYSTEM AND METHOD

(71) Applicant: WESTINGHOUSE AIR BRAKE TECHNOLOGIES CORPORATION, Wilmerding, PA (US)

(72) Inventors: James Edward Trainor, Jr., Cedar Rapids, IA (US); James A Oswald, Coggon, IA (US); Jeffrey John Wolff, Erie, PA (US); Timothy Brown, Erie, PA (US); Henry Young, Erie, PA (US); Lindsay Short, Erie, PA (US); Edward Thomas Petrak, Lawrence Park, PA (US); Ronald Fischer, Fairview, PA (US); Michael Wagner, Erie, PA (US); Justin Chadwell, Draper, VA (US); Carlos Vallejo, Erie, PA (US); Sean Cillessen, Erie, PA (US); Larry Bench, Casper, WY (US); Kenneth Paul Nedley, Lawrence Park, PA (US); Ajith Kuttannair Kumar, Erie, PA (US)

(73) Assignee: WESTINGHOUSE AIR BRAKE TECHNOLOGIES CORPORATION, Pittsburgh, PA (US)

( * ) Notice: Subject to any disclaimer, the term of this patent is extended or adjusted under 35 U.S.C. 154(b) by 622 days.

(21) Appl. No.: 16/888,638

(22) Filed: May 29, 2020

(65) Prior Publication Data

US 2020/0290613 A1 Sep. 17, 2020

Related U.S. Application Data

(63) Continuation-in-part of application No. 16/835,545, filed on Mar. 31, 2020, now Pat. No. 11,491,880, (Continued)

(51) Int. Cl.
*B60L 7/12* (2006.01)
*B60L 7/26* (2006.01)
(Continued)

(52) U.S. Cl.
CPC .............. *B60L 7/12* (2013.01); *B60L 7/26* (2013.01); *B60L 7/28* (2013.01); *B60L 9/22* (2013.01);
(Continued)

(58) Field of Classification Search
CPC ...... B60L 7/12; B60L 7/26; B60L 7/28; B60L 9/22; B60L 15/20; B60L 15/2009;
(Continued)

(56) References Cited

U.S. PATENT DOCUMENTS 3,578,817 A 5/1971 Eastcott
3,578,818 A 5/1971 Eastcott
(Continued)

FOREIGN PATENT DOCUMENTS

AU 2013222040 7/2018
CN 10142429 2/2013
(Continued)

OTHER PUBLICATIONS

DE-10128155-A1 machine translation (Year: 2002).*
Extended European Search Report dated Sep. 29, 2020 for corresponding application No. 17868289.4. (10 pages).

*Primary Examiner* — Frederick M Brushaber
(74) *Attorney, Agent, or Firm* — The Small Patent Law Group LLC; Christopher R. Carroll

(57) ABSTRACT

System and method configured to determine a direction of movement of a vehicle in response to a brake being released or in response to initiating movement of the vehicle from a stopped position along a route. The direction of movement is determined based on a selected travel direction of the
(Continued)

vehicle, a grade of the route, and at least one of applied tractive efforts or applied braking efforts.

4 Claims, 16 Drawing Sheets

Related U.S. Application Data which is a continuation of application No. 15/796,960, filed on Oct. 30, 2017, now Pat. No. 10,640,113, which is a continuation-in-part of application No. 14/974,430, filed on Dec. 18, 2015, now abandoned, which is a continuation of application No. PCT/US2015/010756, filed on Jan. 9, 2015, and a continuation-in-part of application No. 14/464,226, filed on Oct. 14, 2014, now Pat. No. 9,227,515.

(60) Provisional application No. 62/853,886, filed on May 29, 2019, provisional application No. 62/480,590, filed on Apr. 3, 2017, provisional application No. 62/415,589, filed on Nov. 1, 2016, provisional application No. 61/925,733, filed on Jan. 10, 2014, provisional application No. 61/867,780, filed on Aug. 20, 2013.

(51) Int. Cl.

| | | |
|---|---|---|
| *B60L 7/28* | (2006.01) | |
| *B60L 9/22* | (2006.01) | |
| *B60L 15/20* | (2006.01) | |
| *B60L 50/40* | (2019.01) | |
| *B60L 50/61* | (2019.01) | |
| *B60T 13/58* | (2006.01) | |
| *B60W 30/14* | (2006.01) | |
| *B60W 10/18* | (2012.01) | |
| *B60W 30/18* | (2012.01) | |
| *B60W 10/08* | (2006.01) | |
| *E02F 9/22* | (2006.01) | |
| *E02F 9/20* | (2006.01) | |
| *B60L 50/13* | (2019.01) | |
| *B60L 58/12* | (2019.01) | |
| *B60W 40/107* | (2012.01) | |
| *B60T 7/12* | (2006.01) | |

(52) U.S. Cl.
CPC ........... *B60L 15/20* (2013.01); *B60L 15/2009* (2013.01); *B60L 15/2018* (2013.01); *B60L 15/2063* (2013.01); *B60L 15/2081* (2013.01); *B60L 50/13* (2019.02); *B60L 50/40* (2019.02); *B60L 50/61* (2019.02); *B60L 58/12* (2019.02); *B60T 13/586* (2013.01); *B60W 10/08* (2013.01); *B60W 10/18* (2013.01); *B60W 30/146* (2013.01); *B60W 30/18009* (2013.01); *E02F 9/2095* (2013.01); *E02F 9/226* (2013.01); *B60L 2200/36* (2013.01); *B60L 2200/40* (2013.01); *B60L 2210/30* (2013.01); *B60L 2210/40* (2013.01); *B60L 2220/12* (2013.01); *B60L 2220/44* (2013.01); *B60L 2220/46* (2013.01); *B60L 2240/12* (2013.01); *B60L 2240/16* (2013.01); *B60L 2240/32* (2013.01); *B60L 2240/421* (2013.01); *B60L 2240/423* (2013.01); *B60L 2240/429* (2013.01); *B60L 2240/441* (2013.01); *B60L 2240/443* (2013.01); *B60L 2240/642* (2013.01); *B60L 2250/16* (2013.01); *B60L 2250/24* (2013.01); *B60L 2250/26* (2013.01); *B60T 7/122* (2013.01); *B60T 2201/06* (2013.01); *B60W 40/107* (2013.01); *B60W 2520/105* (2013.01); *B60W 2530/10* (2013.01); *B60W 2540/10* (2013.01); *B60W 2552/15* (2020.02); *B60W 2710/083* (2013.01); *B60W 2710/18* (2013.01); *B60W 2720/106* (2013.01); *E02F 9/2075* (2013.01); *E02F 9/2083* (2013.01); *Y02T 10/62* (2013.01); *Y02T 10/64* (2013.01); *Y02T 10/70* (2013.01); *Y02T 10/7072* (2013.01); *Y02T 10/72* (2013.01); *Y02T 90/16* (2013.01); *Y10S 903/902* (2013.01)

(58) Field of Classification Search
CPC ............ B60L 15/2018; B60L 15/2063; B60L 15/2081; B60L 50/13; B60L 50/40; B60L 50/61; B60L 58/12; B60L 2200/36; B60L 2200/40; B60L 2210/30; B60L 2210/40; B60L 2220/12; B60L 2220/44; B60L 2220/46; B60L 2240/12; B60L 2240/16; B60L 2240/32; B60L 2240/421; B60L 2240/423; B60L 2240/429; B60L 2240/441; B60L 2240/443; B60L 2240/642; B60L 2250/16; B60L 2250/24; B60L 2250/26; B60T 13/586; B60T 7/122; B60T 2201/06; B60W 10/08; B60W 10/18; B60W 30/146; B60W 30/18009; B60W 40/107; B60W 2520/105; B60W 2530/10; B60W 2540/10; B60W 2552/15; B60W 2710/083; B60W 2710/18; B60W 2720/106; E02F 9/2095; E02F 9/226; E02F 9/2075; E02F 9/2083; Y02T 10/62; Y02T 10/64; Y02T 10/70; Y02T 10/7072; Y02T 10/72; Y02T 90/16; Y10S 903/902
See application file for complete search history.

(56) References Cited

U.S. PATENT DOCUMENTS

| | | | |
|---|---|---|---|
| 5,301,500 A | 4/1994 | Hines | |
| 5,376,869 A | 12/1994 | Konrad | |
| 6,367,891 B1 | 4/2002 | Smith et al. | |
| 7,055,062 B2 | 5/2006 | Shah | |
| 7,065,457 B1 | 6/2006 | Gemer et al. | |
| 7,188,084 B2 | 3/2007 | Strakman | |
| 7,277,869 B2 | 10/2007 | Starkman | |
| 7,574,452 B2 | 8/2009 | Keen | |
| 7,853,388 B2 | 12/2010 | Wang | |
| 9,081,964 B2 | 7/2015 | Liu | |
| 9,227,515 B2 | 1/2016 | Wolff et al. | |
| 9,360,864 B2 | 6/2016 | Sai | |
| 9,371,076 B2 | 6/2016 | Woo et al. | |
| 9,453,735 B2 | 9/2016 | Mathews, Jr. et al. | |
| 9,931,943 B2 | 4/2018 | Young et al. | |
| 9,944,288 B1* | 4/2018 | Hu ........................ | B60T 7/122 |
| 10,029,664 B2 | 7/2018 | Wolff et al. | |
| 2002/0120382 A1* | 8/2002 | Hatanaka ................ | B60L 50/51 |
| | | | 180/220 |
| 2004/0178754 A1 | 9/2004 | Anwar et al. | |
| 2004/0238244 A1* | 12/2004 | Amanuma ................ | B60L 7/26 |
| | | | 903/917 |
| 2006/0231304 A1* | 10/2006 | Severinsky ............. | B60L 53/20 |
| | | | 290/40 C |
| 2007/0222288 A1 | 9/2007 | Kikuchi et al. | |
| 2009/0145673 A1* | 6/2009 | Soliman ................. | B60K 6/547 |
| | | | 701/22 |
| 2012/0035945 A1 | 2/2012 | Jain | |
| 2012/0072065 A1* | 3/2012 | Minamikawa ......... | B60K 6/547 |
| | | | 903/903 |
| 2013/0057053 A1* | 3/2013 | Staub ............... | B60W 30/18109 |
| | | | 303/3 |

(56) References Cited

U.S. PATENT DOCUMENTS

| | | | |
|---|---|---|---|
| 2013/0060433 A1* | 3/2013 | Maruyama | B60T 7/122 |
| | | | 701/53 |
| 2013/0096797 A1* | 4/2013 | Whitney | B60W 30/18036 |
| | | | 701/87 |
| 2014/0081486 A1 | 3/2014 | Palanti | |
| 2014/0163823 A1* | 6/2014 | Kim | B60W 10/10 |
| | | | 701/43 |
| 2014/0243152 A1* | 8/2014 | Gibson | F02N 11/0818 |
| | | | 477/185 |
| 2015/0081150 A1* | 3/2015 | Wolff | B60L 15/2018 |
| | | | 903/902 |
| 2015/0134147 A1 | 5/2015 | Woo | |
| 2016/0101700 A1 | 4/2016 | Brown | |
| 2016/0325627 A1 | 11/2016 | Young | |
| 2016/0332610 A1 | 11/2016 | Wolff | |
| 2018/0065629 A1* | 3/2018 | Wolff | E02F 9/2095 |
| 2018/0243783 A1 | 8/2018 | Marschke | |

FOREIGN PATENT DOCUMENTS

| | | | | |
|---|---|---|---|---|
| DE | 10128155 A1 * | 3/2002 | | B60K 6/543 |
| FR | 292825 A1 | 5/2009 | | |
| GB | 2517471 A | 8/2013 | | |
| GB | 2547304 A * | 8/2017 | | B60T 8/321 |
| JP | 2000197203 A | 7/2000 | | |
| WO | 2014027071 A1 | 2/2014 | | |
| WO | 2015106060 | 7/2015 | | |
| WO | 2018085324 | 5/2018 | | |

\* cited by examiner

VEHICLE CONTROL SYSTEM AND METHOD

CROSS-REFERENCE TO RELATED APPLICATIONS

The present application claims priority to U.S. Provisional Application No. 62/853,886, filed on May 29, 2019.

This application is also a continuation-in-part of U.S. patent application Ser. No. 16/835,545, filed on 31 Mar. 2020, which is a continuation of U.S. patent application Ser. No. 15/796,960 ("the '960 Application"), filed on 30 Oct. 2017. The '960 Application claims priority to U.S. Provisional Application Nos. 62/480,590, filed on 3 Apr. 2017, and 62/415,589, filed on 1 Nov. 2016.

The '960 Application is also a continuation-in-part of U.S. patent application Ser. No. 14/974,430 ("the '430 Application"), which was filed on 18 Dec. 2015. The '430 application is continuation of International Application PCT/US2015/010756, filed 9 Jan. 2015, which claims priority to U.S. Provisional Application No. 61/925,733, filed on 10 Jan. 2014. The '430 application is also a continuation-in-part of U.S. patent application Ser. No. 14/464,226, filed 20 Aug. 2014, which claims priority to U.S. Provisional Application No. 61/867,780, filed 20 Aug. 2013, and U.S. Provisional Application No. 61/925,733, filed 10 Jan. 2014.

Each of the aforementioned applications is incorporated by reference herein in its entirety.

BACKGROUND

Technical Field

The subject matter described herein include vehicle control systems and methods that are configured to determine a direction of travel of a vehicle.

Discussion of Art

It is sometimes necessary for a vehicle to stop (or nearly stop) along a hill or other graded surface. To stop the vehicle and maintain its position, a control system of the vehicle may direct braking efforts through at least one of a braking system (e.g., air brake system) or dynamic braking using traction motors. As the vehicle transitions from being stopped to being in motion, gravity or other forces may cause the vehicle to move in a direction that is opposite the intended travel direction.

During such rollback conditions, the control system can incorrectly assume that the movement from the stopped position is in a selected travel direction. For example, the control system may receive data from a rotational sensor (e.g., tachometer) that indicates the vehicle is moving. But the rotational sensor may only detect movement and not the direction of movement. With movement detected, the control system may assume that the direction of movement is determined by the travel direction chosen by the operator or by the vehicle control system. In locomotives, the travel direction can be selected using a reverser handle. To prevent the control system from incorrectly assuming the direction of movement, the control system may rely upon other data, such as global positioning system (GPS) data, to validate whether the movement is, in fact, in the selected travel direction.

The other data, however, may not be reliable. For example, the stopped position may be within a region that does not have reliable GPS communication. As such, the control system may be unable to verify that the direction of movement is also the selected travel direction. By the time the control system determines that the movement was in the wrong direction, the traction motors may undergo unwanted stress and/or the vehicle may sustain or cause some damage.

BRIEF DESCRIPTION

In accordance with one embodiment, a system is provided that can include a controller configured to determine a direction of movement of a vehicle from a stopped position along a route in response to a brake being released or in response to initiating movement of the vehicle from the stopped position. The direction of movement is determined based on a selected travel direction of the vehicle, a route grade, and at least one of applied tractive efforts or applied braking efforts.

In accordance with one embodiment, a method is provided that includes determining a selected travel direction of a vehicle along a route and a route grade at a stopped position along the route. The method also includes determining a direction of movement of the vehicle from the stopped position in response to a brake being released or in response to initiating movement of the vehicle from the stopped position. The direction of movement is determined based on the selected travel direction, the route grade, and at least one of tractive efforts or braking efforts applied after the brake is released or the movement is initiated.

In accordance with one embodiment, a vehicle control system is provided that includes a controller configured to determine a selected direction of travel of a vehicle, a direction of movement of the vehicle, and an operational speed of a traction motor. The controller can determine the direction of movement of the vehicle based on the selected direction of travel, a route grade, and at least one of tractive efforts or braking efforts of the vehicle applied as the vehicle moves from a stopped position. The controller can be configured to identify a rollback condition of the vehicle responsive to the direction of movement of the vehicle being different from the selected direction of travel of the vehicle. The controller is also configured to automatically slow or stop movement of the vehicle by automatically actuating a brake of the vehicle responsive to the rollback condition being identified and the operational speed of the traction motor exceeding a designated, non-zero speed threshold.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
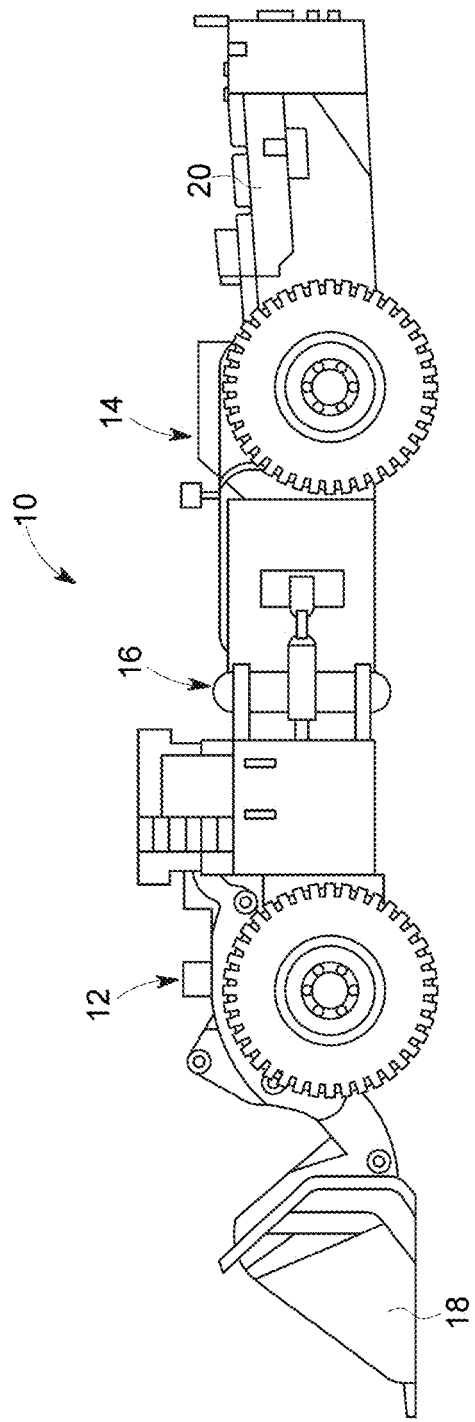
FIG. 1 is a side elevation view of a load-haul-dump vehicle outfitted with a system for preventing vehicle rollback, according to an embodiment of the inventive subject matter.

Embodiments set forth herein include systems (e.g., vehicle control systems) and methods for determining a direction of movement of a vehicle. The direction of movement may be determined after the brake is released or after the movement is initiated. For example, the direction of movement may be determined as the vehicle begins to move from the stopped position, after the brake is released but just prior to the vehicle moving, or after the movement is initiated but just prior to the movement being detected. As such, the term "direction of movement" does not necessarily mean the direction in which the vehicle is currently moving but may also include the direction in which the vehicle is about to move. After determining the direction of movement, embodiments may use the direction of movement for other processes as described herein.

The direction of movement can be determined based on a selected travel direction of the vehicle, a grade of the route, and at least one of applied tractive efforts or applied braking efforts. As used herein, the applied tractive efforts and/or braking efforts may be applied after the brake is released, after the movement is initiated, or prior to the brake being released or the movement being initiated. More specifically, the tractive efforts and/or the braking efforts that are used to determine the direction of movement may be applied prior to the vehicle moving from the stopped position. For example, the amount of tractive efforts and/or the amount of braking efforts necessary for holding a vehicle system at a stopped position can be indicative of or a function of the route grade or the weight of the vehicle.

The selected travel direction of the vehicle may be a direction that a human operator or automated system has chosen for the vehicle. For example, the selected travel direction may be determined by a designated device setting of an operator-controlled device or by a combination of device settings of multiple operator-controlled devices. The operator-controlled device may be or may control a physical mechanism of the vehicle system that controls at least one operation of the vehicle system. For example, in certain embodiments, the operator-controlled device includes a reverser of a vehicle. A reverser can be configured to change a direction of movement of the vehicle. In locomotives, the reverser can have one of a predetermined number of settings. For example, for some locomotives, the reverser can have a forward setting which enables the locomotive to move in a first direction, a rearward (or reverse) setting that enables the locomotive to move in a second direction that is opposite the first direction, or a neutral setting that enables the locomotive to move in either direction. Although the described example only has three settings, it is contemplated that the operator-controlled device may have one setting, two settings, or more than three settings.

In some embodiments, the reverser is a movable object that is configured to be engaged by an operator and moved to a different position, thereby changing the setting of the reverser. The movable object may be, for example, a lever or handle that is configured to be moved to three different positions. In some embodiments, the reverser includes or is operably connected to a circuit device that is used to change motor connections in order to change the direction of motor rotation and, consequently, the direction of movement. In such instances, the settings of the reverser can be selected by, for example, moving a switch, rotating a knob, or pressing a button. As another example, a user-selectable element can be displayed on a computer screen and may be selected by the operator to change the setting of the reverser.

Alternatively or in addition to the reverser, the operator-controlled device can be other devices that are capable of having different device settings. For example, the operator-controlled device may be a steering wheel having multiple rotational settings or a gearbox having a predetermined number of selectable gear settings. Similar to the reverser, each of the steering wheel and the gearbox at least one of controls, determines, or affects operation of the vehicle system. Specifically, the steering wheel is operably coupled to a physical mechanism that determines a direction of movement of the vehicle system, and the gearbox is a physical mechanism that determines which gears are engaged.

Vehicle systems may include a single vehicle or a group of vehicles in which some or all of the vehicles can contribute at least one of tractive (or propulsive) efforts or braking efforts. For example, at least some embodiments may have a distributed power (DP) configuration or arrangement of propulsion-generating vehicles (e.g., locomotives). Lead vehicles can transmit commands to one or more remote vehicles so that the lead and remote vehicles may coordinate efforts in controlling movement of the vehicle system.

Throughout this document the term vehicle system is used. A vehicle system may include only one vehicle system or more than one vehicle system. If the vehicle system includes more than one vehicle system, the vehicle systems may be operably coupled to each other such that the vehicle systems move together as a system along a route. Optionally, the vehicle systems may coordinate their tractive efforts and braking efforts to move the vehicle system. For example, two or more vehicle systems may be mechanically coupled to travel together along the route. A vehicle system may also be referred to as a vehicle system consist in some embodiments.

A vehicle system may have one or more propulsion-generating vehicles (e.g., vehicles capable of generating propulsive forces or tractive efforts) connected together so as to provide motoring and/or braking capability for the vehicle system. The propulsion-generating vehicles (or propulsion vehicles) may be directly connected together in series with no other vehicle systems or cars between the propulsion-generating vehicles. Alternatively, one or more non-propulsion-generating vehicles (e.g., vehicle systems that are not capable of generating propulsive forces or tractive efforts) may be linked between two propulsion-generating vehicles. Non-propulsion-generating vehicles may include, for example, rail cars, passenger cars, or other vehicle systems that cannot generate propulsive force to propel the vehicle system.

Multiple interconnected propulsion-generating vehicles may form a vehicle system consist in which the propulsion-generating vehicles coordinate tractive and/or braking efforts with one another to move the vehicle system consist. One example is a locomotive consist that includes locomotives as the propulsion-generating vehicles. A larger vehicle system, such as a train, can have multiple sub-consists. Specifically, there can be a lead consist (of propulsion-generating vehicles), and one or more remote consists (of propulsion-generating vehicles), such as midway in a line of cars and another remote consist at the end of the vehicle system.

Although the illustrated examples include locomotives and locomotive consists, other vehicle systems may form the vehicle system. For example, a cargo carrier may include one or more propulsion-generating vehicles and one or more cargo cars for carrying cargo. Other types of vehicle systems may include automobiles, trucks, marine vessels, off-highway vehicle systems, and agricultural vehicle systems. In some embodiments, vehicle systems may not be mechanically coupled in other embodiments, but may be logically coupled by the vehicle systems communicating with each other to coordinate their movements to travel as a vehicle system, consist or swarm (collectively "consist").

The vehicle system may have a lead propulsion-generating vehicle and a remote propulsion-generating vehicle. The terms "lead," "trail," and "remote" are used to indicate which of the propulsion-generating vehicles control operations of other propulsion-generating vehicles, and which propulsion-generating vehicles are controlled by other propulsion-generating vehicles, regardless of locations within the vehicle system. For example, a lead propulsion-generating vehicle can control the operations of the trail or remote propulsion-generating vehicles, even though the lead propulsion-generating vehicle may or may not be disposed at a front or leading end of the vehicle system along a direction of travel. In DP operation, throttle and braking commands are relayed from the lead propulsion-generating vehicle system to the remote propulsion-generating vehicle systems by wireless and/or wired connections.

A vehicle system can be configured for DP operation in which throttle and braking commands are relayed from the lead propulsion-generating vehicle to the remote propulsion-generating vehicles by wireless and/or hardwired links. DP operation may include synchronous or asynchronous control (e.g., of the traction motors, dynamic braking, and air brakes) of multiple remote locomotives within a single consist or vehicle system. In addition to commands transmitted from lead to remote vehicles, messages including status information may be transmitted from the remote vehicles to the lead vehicle.

Embodiments may include or be applicable to vehicles or vehicle systems, vehicle control systems, and methods related to the same, such as those described in U.S. application Ser. No. 16/720,366, filed on Dec. 19, 2019, which is hereby incorporated by reference in its entirety.

In some aspects, embodiments may include load-haul-dump vehicles having a diesel engine that are utilized in the underground mining industry. Embodiments can also be applicable for use with internal combustion engines and vehicles employing such engines, generally. For example, the vehicles may be off-highway vehicles designed to perform an operation associated with a particular industry, such as mining, construction, farming, etc., and may include haul trucks, cranes, earth moving machines, mining machines, farming equipment, tractors, material handling equipment, earth moving equipment, etc. Alternatively or additionally, the vehicles may be on-road vehicles, such as tractor-trailer rigs, on-road dump trucks, etc. Moreover, yet other embodiments of the inventive subject matter are applicable to purely electric vehicles and machinery, such as battery powered vehicles.

As used herein, "electrical communication" or "electrically coupled" means that certain components are configured to communicate with one another through direct or indirect signaling by way of direct or indirect electrical connections. As also used herein, "zero speed" refers to a condition of a vehicle when it is stopped/static. "Near zero" speed means very-nearly stopped (e.g., in an embodiment, traveling no more than 5 mph/8 kph, or in another embodiment, traveling no more than 1 mph/1.6 kph).

Embodiments may be configured to reduce the likelihood of a vehicle rolling backwards on grade. "Grade" refers to a non-flat surface having an incline of greater or less than zero degrees. "Service brake" refers to a mechanical friction brake, e.g., typically of the type where a brake pad is actuated with an air/pneumatic or hydraulic system to engage a rotor or disc that is connected to a wheel or axle, and which is typically separate from the propulsion system.

Embodiments may be applicable to the subject matter described in U.S. Patent Application Publication No. 2018/0065629 A1 (hereinafter "US2018/0065629"), which is hereby incorporated by reference in its entirety. For example, embodiments may determine a direction of movement, which may then be used by embodiments described in US2018/0065629 to control movement of a vehicle.

Methods described herein may be implemented by one or more processors of a controller that are configured to execute one or more sets of instructions stored in memory (e.g., one or more computer-readable mediums). The computer-readable medium (e.g., a tangible and non-transitory computer readable storage medium) may have one or more programs (or sets of instructions) that direct a controller to perform one or more operations, such as those described herein. For example, the methods may be implemented by one or more processors within, for example, at least one of a lead controller or a remote controller. In such an embodiment, the steps or operations described herein may be performed by a program stored in memory and operable in a processor (e.g., microprocessor or other logic-based device). When implemented in a processor, program code may configure the processor to create logical and arithmetic operations to process the steps and/or operations.

In particular embodiments, the controller can be a locomotive control module (LCM). For embodiments that relate to vehicle systems having lead and remote vehicles, the controller can be configured to generate and transmit messages (e.g., commands, queries, etc.) from a lead vehicle to a remote vehicles. Messages may be generated by the lead controller in response to operator inputs. For example, the lead controller may generate and transmit messages in response to the operator manually changing the throttle and/or braking efforts or manually entering information regarding the route or the vehicle systems of the vehicle system. The lead controller may also automatically generate and transmit messages in response to receiving messages from the control tower and/or the off-board repeater. In particular embodiments, the lead controller may automatically determine a direction of movement in response to at least one of a brake being released or actual movement of the vehicle being detected.

The controllers of different vehicles may communicate with one another to control one or more functions (e.g., application of motive power or braking). The remote vehicles may include a remote controller for receiving messages from the lead controller, processing data of the remote vehicle, and responding to the messages from the lead vehicle. In some embodiments, the remote controllers are capable of being lead controllers if the corresponding vehicle is designated as the lead vehicle.

A distributed power configuration of the vehicle system may operate a synchronous mode or in an asynchronous mode. In the synchronous mode, the remote vehicles follow the throttle position of the lead vehicle. If the operator moves the throttle handle from a notch five position to a notch seven position, the communications system commands each of the enabled remote vehicles to operate at a notch seven throttle. Likewise, if the operator moves the throttle handle to a dynamic brake position (i.e., where the traction motors are operated to provide a braking force to the vehicle system), the communications system commands each remote vehicle to the same dynamic brake application. In the asynchronous mode, the traction motors and/or the braking systems of the different vehicle systems may operate independently. For example, the operator may segregate the vehicle system into a front vehicle system consist and a rear vehicle system consist that each have a plurality of propulsion-generating vehicles.

Embodiment may utilize an air brake (or pneumatic brake) system. It should be understood, however, that other embodiments may use a modified braking system or use or also include a different type of braking system. In some embodiments, the braking system includes a an electronically-controlled pneumatic (ECP) air brake arrangement. More than one type of braking technology may be used in a single braking system. For example, a braking system may include air brakes (or pneumatic brakes), electrodynamics brakes, mechanical brakes, or electromagnetic brakes. Brake and braking systems may include those described in U.S. application Ser. No. 16/720,366, filed on Dec. 19, 2019, which is hereby incorporated by reference in its entirety.

For purposes of the description hereinafter, the terms "end," " upper," "lower," "right," "left," "vertical," "horizontal," "top," "bottom," "lateral," "longitudinal," "forward," "reverse," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the one or more embodiments. Hence, the specific examples or aspects disclosed herein are not to be construed as limiting.

FIG. 1 illustrates a load-haul-dump vehicle 10, in which a control system of the inventive subject matter may be incorporated. The LHD vehicle includes a front chassis 12 connected to a rear chassis 14 through an articulated joint 16. The vehicle 10 also includes a bucket 18 at the front thereof for engaging an overburden pile and/or for moving overburden and/ mined material. The bucket 118 is operable via a hydraulic lift assembly (not shown). A rear of the vehicle 100 is provided with a compartment 20 within which a diesel engine (in the case of diesel engine driven vehicle) or batteries (in the case of an electrically driven vehicle) for providing motive power to the vehicle 10 and its accessories are housed.

Figure 2:
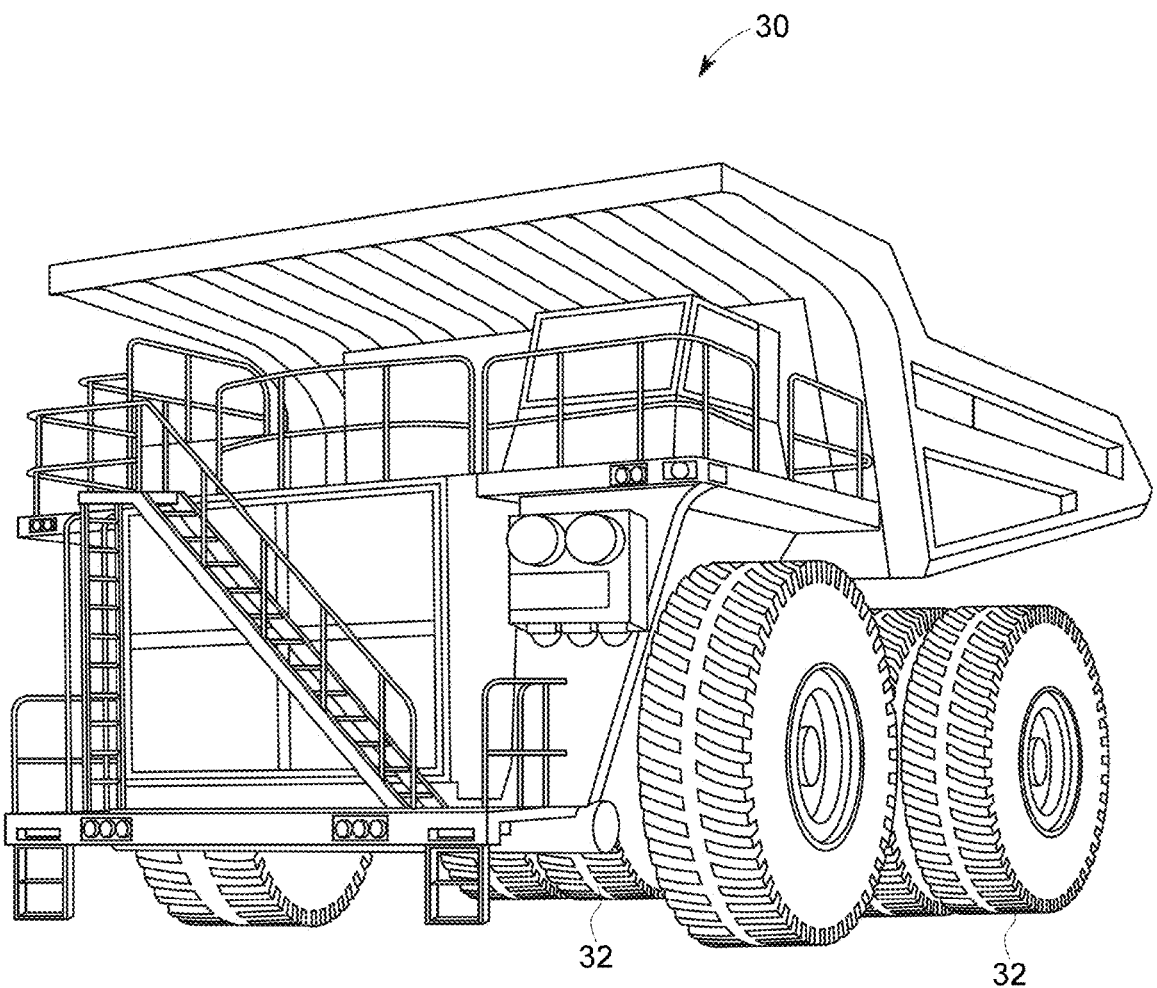
FIG. 2 is a perspective view of another vehicle outfitted with a system for preventing vehicle rollback, according to an embodiment of the inventive subject matter.

With reference to FIG. 2, the vehicle may be a haul truck 30. The haul truck 30 is a dump truck specifically engineered for use in high production mining and heavy-duty construction environments. The drive system of the haul truck includes drive wheels 32 coupled to a diesel-electric power/traction system which provides motive power to the haul truck. (The haul truck and underground mining vehicles are illustrative of vehicles generally, although in embodiments, a system and/or method of the inventive subject matter is implemented on a haul truck or an underground mining vehicle specifically.)

Figure 3:
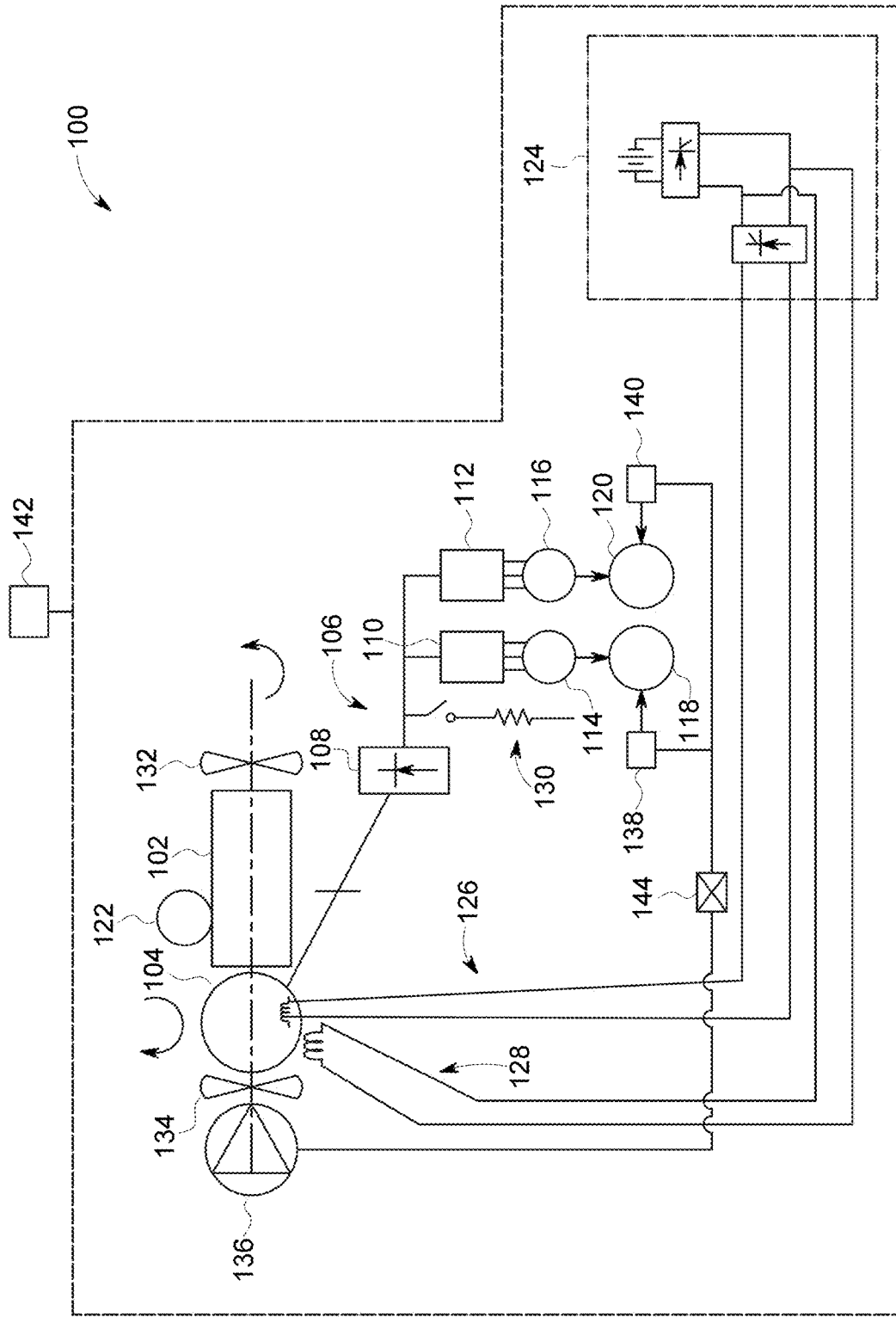
FIG. 3 is a schematic diagram of a drive system and system for preventing vehicle rollback, according to an embodiment of the inventive subject matter.

FIG. 3 schematically illustrates an example of a drive system 100 for an electric drive machine such as LHD vehicle 10 or haul truck 30. The drive system 100 includes a primary power source such as an engine 102 (e.g., a diesel engine, a gasoline engine, a multi-fuel engine, etc.) and a traction alternator/generator 104 mechanically coupled to and driven by the engine 102. As illustrated in FIG. 3, the traction alternator 104 is electrically coupled to a traction bus 106. The alternator 104 is configured to provide AC electric power to one or more rectifiers 108, which are electrically connected to one or more power converters, e.g., first and second inverters 110, 112, via the traction bus 106. The inverters 110, 112 are connected to one or more motors, such as first and second traction motors 114, 116 associated with first and second wheels of the vehicle, e.g., rear wheels 12 (including first rear wheel 118 and second rear wheel 120) of vehicle 10, respectively. Optionally, the vehicle may have a single motor or more than two motors. While two inverters and two motors are shown in FIG. 3, one or more embodiments of the inventive subject matter described herein may be used in connection with a single inverter and a single motor, or more than two inverters and more than two motors in a vehicle. The rectifier 108 is configured to convert the AC power received from the alternator 104 into a DC output which is then fed to the inverters 110, 112 through the traction bus 106. The inverters 110, 112 are configured to supply three-phase, variable frequency AC power to the first and second traction motors 114, 116 associated with the first and second wheels 118, 120 of the vehicle 10 (typically the rear wheels of the vehicle).

As also shown in FIG. 3, in an embodiment, a starter motor 122 may be associated with the engine 102 for rotating the engine 102 so as to initiate operation, as is known in the art. In addition, the vehicle may include a battery 124, e.g. a 24V battery, electrically coupled to the alternator 104 through a tertiary winding 126 and a field winding 128. The battery 124 is configured to function as an alternator field static excitor to initiate operation of the electric drive system 100 of the vehicle 10.

The traction motors 114, 116 provide the tractive power to move the vehicle, and may be AC or DC electric motors. When using DC traction motors, the output of the alternator is typically rectified to provide appropriate DC power. When using AC traction motors, the alternator output is typically rectified to DC and thereafter inverted to three-phase AC before being supplied to the traction motors 114, 116. During a propel mode of operation, power may be transferred from the engine 102 to the traction motors 114, 116, and thus to the wheels 118, 120 of the vehicle 10 to effect movement.

In addition to providing motive power, the traction motors 114, 116 may also provide a braking force or braking effort for controlling the speed of the vehicle 10 on which the drive system 100 is deployed. This is commonly referred to as dynamic braking. During a dynamic braking mode of operation, such as when motion of the vehicle is to be retarded, power may be generated by the mechanical rotation of the drive wheels and directed toward a retarding grid 130. In particular, the kinetic energy of the vehicle 10 may be converted into rotational power at the drive wheels 118, 120. Rotation of the drive wheels may further rotate the traction motors 114, 116 so as to generate electrical power, for example, in the form of AC power. The inverters 110, 112 may serve as a bridge to convert the power supplied by the traction motors 114, 116 into DC power. Dissipation of the DC power generated by the traction motors 114, 116 may produce a counter-rotational torque at the drive wheels 118, 120 to decelerate the vehicle 10. Such dissipation may be accomplished by passing the generated current provided by the inverters 110, 112 through a resistance, such as the dynamic braking grid 130, or retarding grid, as shown.

As further illustrated in FIG. 3, the drive system 100 also includes an engine radiator fan 132 driven by the engine 102 to provide cooling for the engine 102. The system 100 may also include one or more control and motor cooling fans 134 mechanically coupled to the alternator 104. The cooling fan(s) 134 is configured to provide cooling for all components of the traction drive system, such as the inverters 110, 112, traction motors 114, 116 and the like.

The alternator 104 may also be coupled to a hydraulic pump 136 which provides hydraulic pressure for use by accessories or other components of the vehicle. For example, the hydraulic pump 136 may be configured to provide hydraulic pressure for use by the bucket arm 18 and/or braking devices, such as one or more hydraulic service brakes 138, 140 associated with one or more wheels of the vehicle 10 (e.g., depicted in FIG. 3 as being associated with wheels 118, 120). While two brakes are shown in FIG. 3, optionally, the vehicle can include a single brake or more than two brakes. The hydraulic service brakes 138, 140 are operable to provide a frictional braking force or braking effort for the wheels 118, 120 of the vehicle 10 to stop or slow the vehicle, and may be utilized to supplement, or in place of, the braking effort provided by the traction motors 114, 116 when operating in the dynamic braking mode of operation. In an embodiment, the hydraulic service brakes 138, 140 are fluidly coupled to hydraulic pump 136 and include one or more electro-hydraulic proportional valves 144, the position of which may be controlled by a controller, as discussed hereinafter, to control an amount of braking effort provided by the brakes 138, 140. Other types of valves may also be utilized.

While the vehicle 10 described herein is disclosed as including braking devices in the form of hydraulic service brakes, other types of service brakes may also be utilized on-board the vehicle without departing from the broader aspects of the inventive subject matter. For example, the service brakes may be any type of frictional brake known in the art that utilize a wear surface that contacts (e.g., by clamping or pressing against) a rotating or moving component of a wheel of the vehicle to slow or stop the rotation of the wheel by friction to slow or stop the vehicle. Forcing of the wear surface of the frictional brake against a portion of the wheel (e.g., a disc, drum, etc.) may be accomplished mechanically, hydraulically, pneumatically or electromagnetically. As used herein, "service brakes" may encompass vehicle parking brakes and/or wheel brake locks. Optionally, the brake that is applied may be one or more traction motors that are engaged to not rotate in a rearward direction (e.g., relative to a selected or previous direction of travel).

Regardless of the particular type of service brake utilized, the braking devices 138, 140 may be manually deployed or actuated by an operator of the vehicle such as, for example, by depressing a brake pedal within an operator cab or by pressing a button on a user interface, although other means of initiating the frictional contact of the brake with a rotating wheel component may also be utilized. In an embodiment, application of the service brakes 138, 140 may also be controlled automatically by a controller or control unit of the vehicle. In particular, as further illustrated in FIG. 3, the drive system 100 and various components thereof, including the braking devices 138, 140 may be electrically coupled (or otherwise in communication with) and controlled by a controller 142. The controller 142 can represent hardware circuitry that includes and/or is connected with one or more processors (e.g., one or more microprocessors, field programmable gate arrays, and/or integrated circuits). In particular, the controller 142 is configured to control the traction motor system 100 and the various components thereof, and the electricity supplied to and from the traction motor system.

As discussed hereinafter, the controller 142 is also operable to automatically prevent vehicle rollback when on grade through the coordinated control of the service brakes 138, 140 and the drive system 100. In particular, the control unit or controller 142 is configured to automatically apply the service brakes 138, 140 and/or control the torque output of the wheel motors 114, 116 to hold the vehicle 10 at zero speed or near zero speed on grade during various operating conditions, without input from an operator of the vehicle, in order to prevent inadvertent rollback. As used herein, "automatically" means without input or intervention from an operator of the vehicle. As used herein, "rollback condition" means a state or condition where vehicle movement in a direction opposite or different from a selected or desired direction of travel is possible in the absence of braking or depression of the accelerator pedal of the vehicle.

For example, a rollback condition is possible when a vehicle is traveling on grade and an operator desires to bring the vehicle a stop. As the operator or control system releases an acceleration input device of the vehicle, such as the accelerator pedal (or otherwise manually or automatically ceases acceleration in a direction of travel), the vehicle will quickly decelerate due to the grade on which the vehicle is traveling, and the vehicle will approach zero speed. Additionally, the vehicle may decelerate even if the operator continues to actuate the acceleration input device (e.g., depress a pedal) due to the grade in the route. As the zero-speed threshold is reached, the vehicle can roll backward in the absence of application of the service brakes or parking brakes. To prevent this backward movement, one or more brakes may be automatically actuated and/or one or more motors may be automatically operated to generate torque in an opposite direction. This results in the vehicle maintaining a position on the route (e.g., not rolling backward) or the vehicle slightly moving backward at a controlled speed.

The vehicle movement in one or more directions can be determined using one or more sensors 300. These sensors 300 can include a global positioning system receiver, a reflective sensor, an interrupter sensor, an optical encoder, a variable-reluctance sensor, a Wiegand sensor, a Hall-effect sensor, or the like. The controller 142 can determine the direction of travel of the vehicle 10 based on output from the sensors 300.

Figure 4:
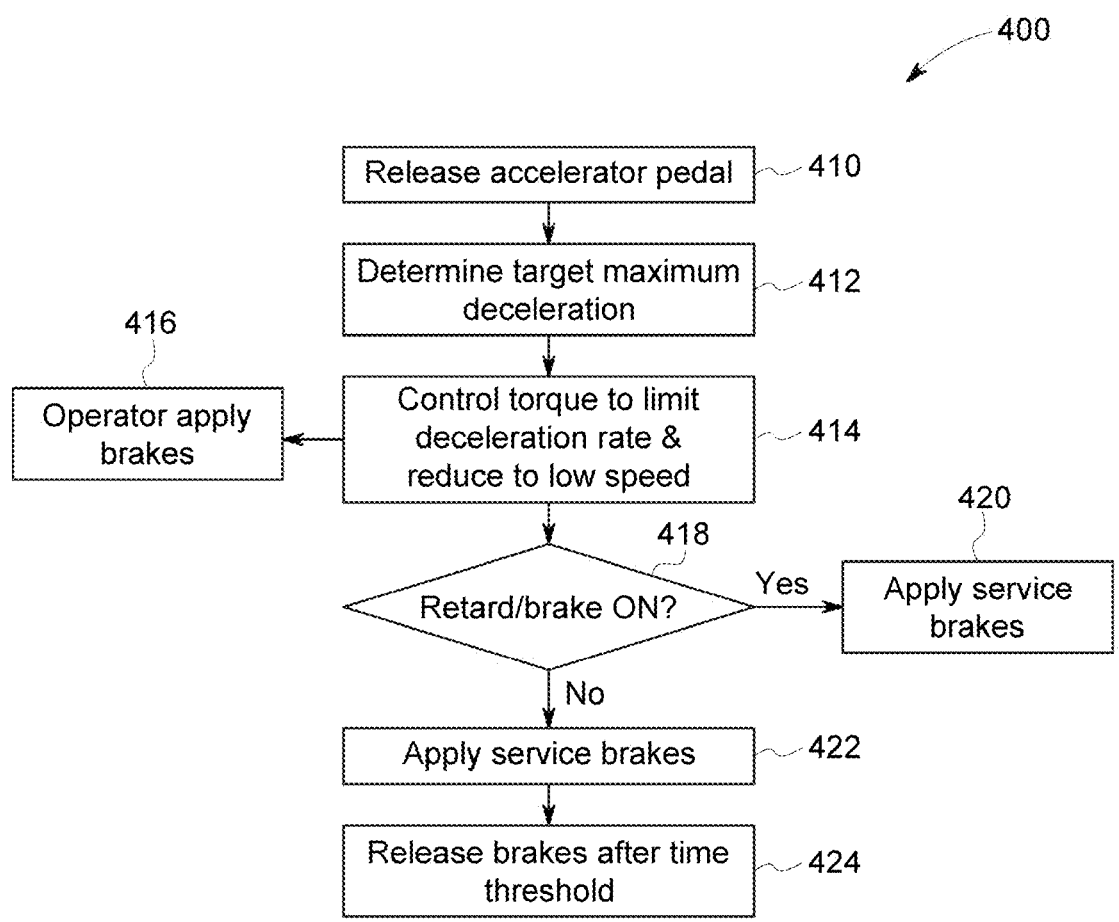
FIG. 4 is a diagram illustrating a control routine for preventing vehicle rollback, according to an embodiment of the inventive subject matter.

FIG. 4 illustrates a flowchart of one embodiment of a method 400 for preventing vehicle rollback. The flowchart can represent operations performed under the direction of a control routine performed by the controller 142 for preventing vehicle rollback when an operator desires to bring a vehicle to stop on grade. As shown therein, when the operator releases the accelerator pedal at 410, the controller 142 is configured to determine a target maximum deceleration based upon payload, vehicle speed and/or estimated grade at 412, and to control torque as needed to maintain vehicle deceleration to less than the maximum deceleration rate and to slow the vehicle, at 414.

The payload weight can be determined based on input provided to the controller 142 from an operator, a manifest, a sensor (e.g., a scale on which the payload is located), or the like. The vehicle speed can be determined by one or more of the sensors 300, such as a global positioning system receiver, a tachometer, or the like. The estimated grade can be determined from input provided by an operator or by reference to a database containing grades of the route at different locations. Optionally, one or more of the sensors 300 can include an inclinometer, accelerometer, or the like, that can output data indicative of the grade or estimated grade of a route. The target maximum deceleration (or upper deceleration limit) can decrease for heavier payloads (or increase for lighter payloads), can decrease for slower vehicle speeds (or increase for faster vehicle speeds) in a direction that is opposite of a selected or previous direction of travel, and/or can decrease for lesser grades (e.g., grades that are flatter) or increase for steeper grades (e.g., grades that are more inclined).

The drive system 100 is utilized to provide a controlled descent/slowing of the vehicle (rather than just letting gravity take over). For example, the torque generated by the traction motor(s) of the drive system 100 can be controlled (e.g., automatically) to achieve a target deceleration of the vehicle and reduce the speed of the vehicle to a very low, but non-zero, speed. The vehicle and motor(s) of the vehicle may continue to operate in the selected direction of travel. That is, the vehicle may not begin rolling backward down the grade or stopping movement to zero speed. As shown at 416, in an embodiment, the operator can then manually apply the service brakes 138, 140 at zero speed or at a very low, near zero (but positive) speed. This can allow for the drive system 100 to prevent rollback of the vehicle without applying any brake of the vehicle. For example, backward movement of the vehicle down the grade can be prevented by applying a torque via the traction motor(s) of the vehicle that does not propel the vehicle in a selected direction of travel (e.g., up the grade), but that also prevents the vehicle from rolling back down the grade.

As further shown in FIG. 4, in an embodiment, the controller 142 may be configured to automatically apply the service brakes 138, 140 as the vehicle approaches zero speed under controlled deceleration, but while the vehicle is still moving in a selected/desired direction of travel. In particular, the controller 142 determines, at 418, whether or not a brake pedal input/retard command is present (such as input by an operator) or if the accelerator pedal feedback exceeds a threshold. If retard/brake is ON or accelerator pedal feedback exceeds a threshold, and vehicle speed is less than a threshold speed (i.e., as the vehicle approaches zero speed), then the controller 142 applies the service brakes 138, 140 regardless of controlled deceleration or abnormal zero torque deceleration, at 420. If, however, no accelerator pedal or brake feedback is received/detected, and the vehicle speed is less than a threshold speed (i.e., as the vehicle approaches zero speed), then the controller 142 automatically applies the service brakes 138, 140 at a learned speed threshold at zero speed or near zero (but positive speed) based on brake delay time (i.e., the time it takes the brakes to engage and slow/stop the vehicle) and vehicle deceleration, at 422.

Further, if no accelerator pedal or brake input (e.g., manual engagement of the brakes by an operator) is received after a predetermined time has elapsed, then the brakes 138, 140 are then released, at 424. In either embodiment, the brakes may be automatically applied at a learned speed threshold at zero speed or near zero (but positive speed) based on brake delay time (i.e., the time it takes the brakes to engage and slow/stop the vehicle) and vehicle deceleration. For example, the controller 142 may be configured to apply the brakes earlier when decelerating at a rapid rate, and later when decelerating at a slower rate. The inventive described herein therefor provides a means for preventing vehicle rollback when bringing a vehicle to a stop on grade, and provides for a smooth transition from vehicle movement to stop.

Figure 5:
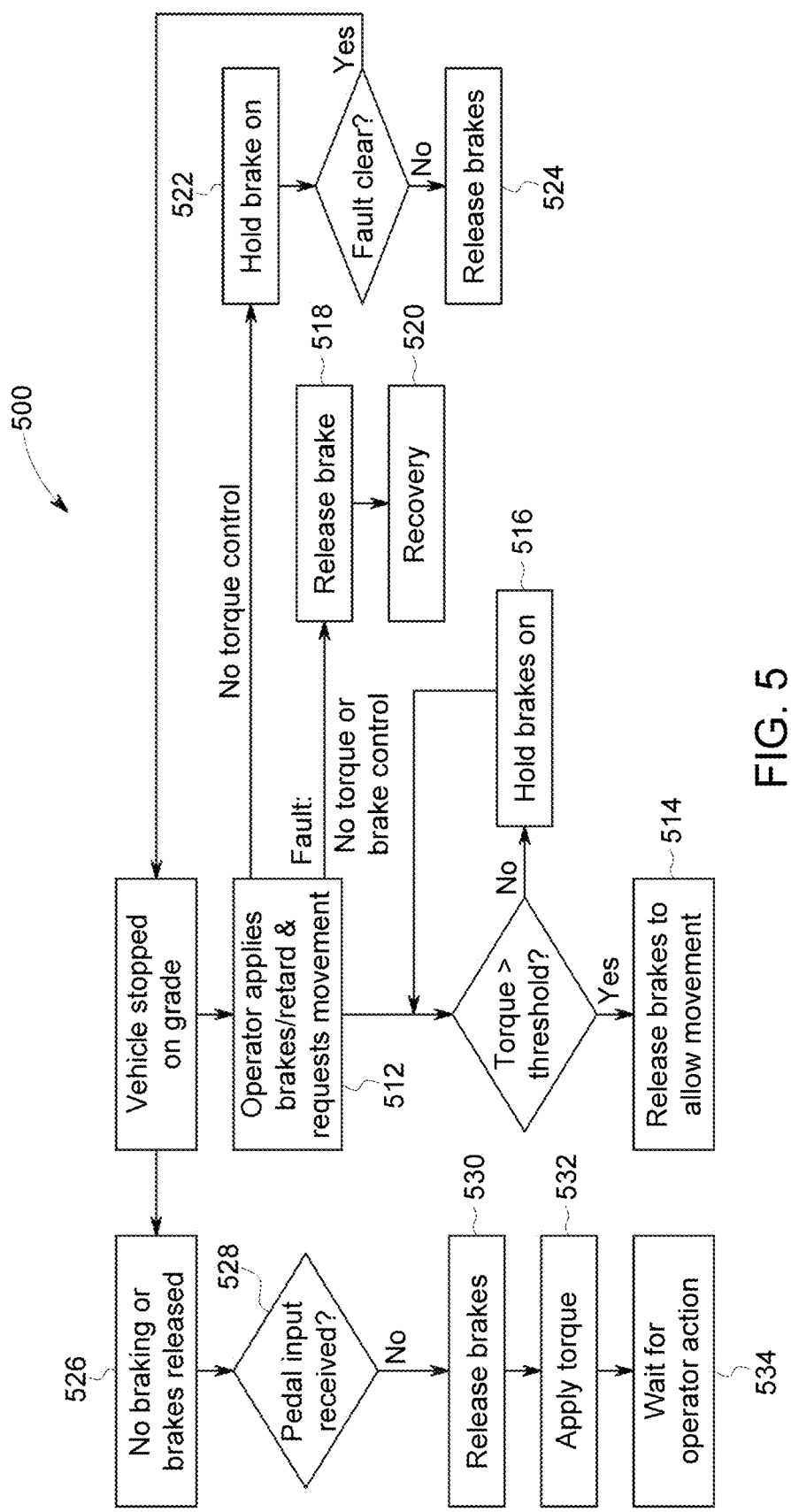
FIG. 5 is a diagram illustrating a control routine for preventing vehicle rollback, according to another embodiment of the inventive subject matter.

Another situation where vehicle rollback can occur is starting a vehicle on grade. When the vehicle is stopped on grade, typically the drive system holds the brake on. The brake may have been applied once the vehicle was stopped, or automatically applied during deceleration, as discussed above. FIG. 5 illustrates a flowchart of one embodiment of a method 500 for preventing vehicle rollback when starting movement on a grade. The flowchart can represent operations performed or carried out by the controller 142 for preventing vehicle rollback when starting a vehicle on grade. As shown at 510, initially, the vehicle is stopped and the drive system holds the vehicle in static position (either through retarding action of the traction motors or through application of the service brakes (e.g., parking brake)). In an embodiment, at 512 an operator applies the brake/retarding effort to maintain vehicle position, and presses the accelerator pedal to ramp up torque to initiate movement. For example, the operator may select a direction of travel (e.g., by providing input into the control system through one or more input devices) and apply the throttle to command vehicle motion. When the torque available at the traction motors exceeds a threshold value sufficient to prevent rollback (i.e., balance torque), the brakes are released at 514 and the vehicle is permitted to move in the selected direction of travel. Otherwise, the brakes are continued to be held on by the controller 142, at 516, until the torque exceeds the threshold. In an embodiment, the torque threshold may be selected in dependence upon the estimated grade.

As further shown in FIG. 5, certain fault conditions may demand other actions to be taken. For example, drive system torque control and drive system brake control may not be enabled or available. If such a fault condition is present, the controller 142 is configured to release the brakes 138, 140 at 518 to prompt operator action. At 520, if the fault condition clears, the controller 142 controls the drive system 100 to respond to the operator/pedal inputs as normal. In another embodiment, drive system brake control may be available and functioning, but drive system torque control may not be. In this case, the controller 142 is configured to hold the brakes 138, 140 on during such fault condition, at 522. If the fault clears, then the control routine proceeds to the initial condition 510. If, however, the fault does not clear after a predetermined time, the controller 142 releases the brakes 138, 140 while the fault is active, at 524, to prompt the operator to take action (e.g., apply service brakes, press override switch, control movement, etc.).

Referring still further to FIG. 5, in an embodiment, the operator may not apply any braking or acceleration input/throttle command or the operator may release the brakes (or remove a commanded retarding effort), at 526. In such case, the controller 142 waits for a predetermined time for a pedal input (e.g., retard/brake/throttle feedback), at 528. If a pedal input is received within the predetermined time period/window, then the control routine proceeds to step 512. If, however, no pedal input is received within the window, the controller 142 controls the drive system 100 to release the brakes 138, 140 and or remove any retarding effort, at 520. In such case, the drive system 100, under control of the controller 142, then applies torque at 532 to allow very slow positive or negative speed, or allows acceleration up to a predetermined speed limit. That is, the drive system 100 is utilized to allow very low speed in the direction of gravity (i.e., limiting rolling speed and prompting the operator to take some action). At 534, the very slow positive or negative speed continues until the operator commands acceleration torque or the operator stops the vehicle utilizing the brake/retard pedal.

Figure 6:
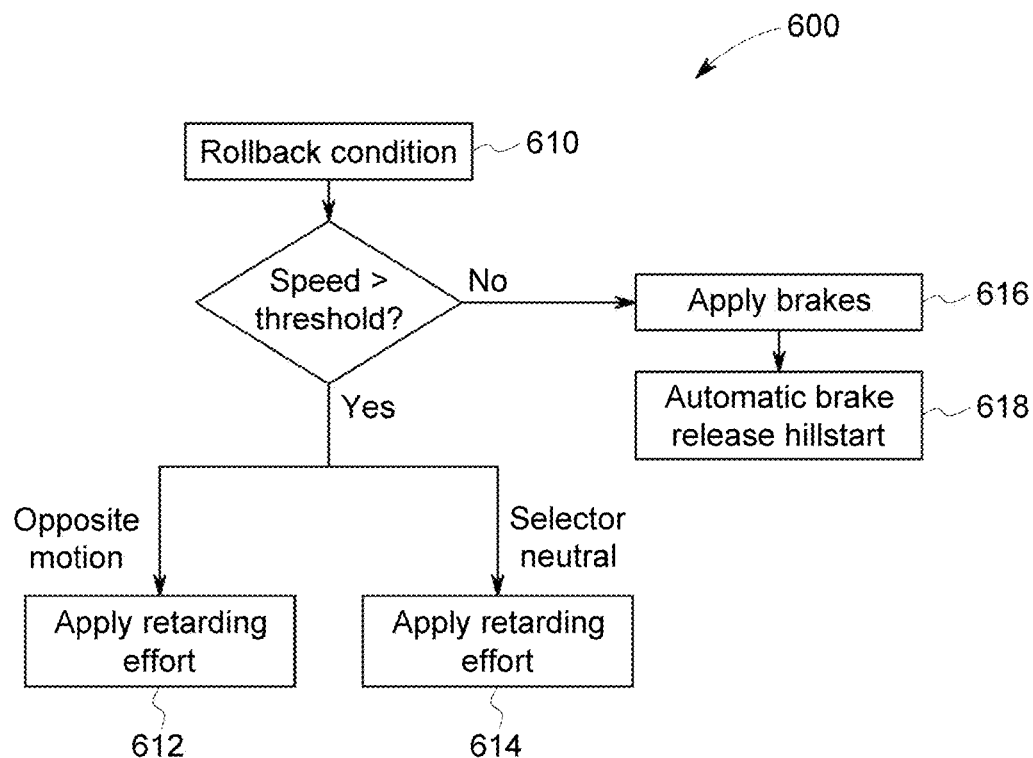
FIG. 6 is diagram illustrating a control routine for preventing vehicle rollback, according to another embodiment of the inventive subject matter.

Turning now to FIG. 6, a flowchart of one embodiment of a method 600 for controlling a vehicle during a rollback condition is illustrated. The flowchart can represent operations performed or carried out by the controller 142 during a rollback condition. The rollback condition may occur, for example, as a result of a drive system fault (e.g., a no propel fault), if the operator changes the selected direction of travel, or if the vehicle decelerates too quickly, crosses zero speed and starts rolling the opposite direction before the brakes can be applied. As shown in FIG. 6, 610 indicates the presence of a rollback condition. In an embodiment, if the speed of the vehicle exceeds a threshold speed stored in memory (i.e., a negative speed indicating rollback) and vehicle movement is detected in a direction opposite the selected direction of travel, the controller 142 is configured to automatically control the traction motors 114, 116 to provide retarding effort to slow the vehicle, as illustrated at 612. The vehicle movement in one or more directions can be determined using one or more of the sensors 300 shown in FIG. 3. In an embodiment, the threshold speed may be approximately 6 mph. In an embodiment, the controller 142 is configured to control the drive system 100 to hold the vehicle speed at approximately 3 mph.

As also shown in FIG. 6, if the speed of the vehicle exceeds a threshold speed stored in memory (i.e., a negative speed indicating rollback) and the selector is in neutral, the controller 142 is configured to automatically control the traction motors 114, 116 to provide retarding effort to slow the vehicle, as illustrated at 614. In an embodiment, the threshold speed may be approximately 5 mph. In an embodiment, the controller 142 is configured to control the drive system 100 to hold the vehicle speed at approximately 3 mph.

In an embodiment, if the speed of the vehicle does not exceed a threshold speed but is still experiencing a rollback condition, the controller 142 may apply the brakes 138, 140 automatically, at 616. This may occur, for example, if the vehicle is brought to a stop under negative speed conditions. Alternatively, the brakes can be automatically applied or otherwise actuated at 616 responsive to the speed of the vehicle not exceeding the threshold speed (also referred to as an upper limit on the speed) without a rollback condition occurring or without a rollback condition being detected. For example, if the vehicle was nearly balanced on a grade and had very low acceleration (e.g., toward zero speed) in the intended or selected direction of travel, the brakes could be applied at some very low speed that does not exceed an upper speed limit (e.g., 30 revolutions per minute of a motor), regardless of whether the acceleration is at or near zero. This can result in the brake(s) being applied without the vehicle rolling back down the grade or without detecting the vehicle rolling back down the grade (e.g., a rollback condition). As shown at 618, the controller 142 may then automatically release the brakes and control the traction motors 114, 116 to provide torque to allow slow speed creep after a set time period. In an embodiment, if the brake is set during the rollback condition, the operator may be required to apply and release the brakes prior to vehicle movement.

Figure 7:
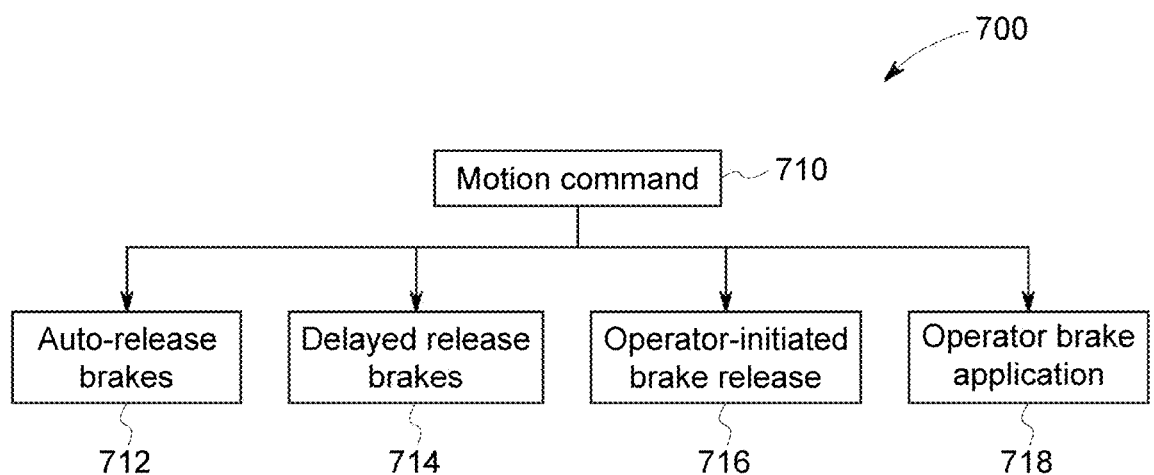
FIG. 7 is diagram illustrating a control routine for preventing vehicle rollback, according to another embodiment of the inventive subject matter.

FIG. 7 illustrates a flowchart of one embodiment of a method 700 for controlling vehicle movement. The flowchart can represent operations performed or carried out by the drive system 100 or the controller 142. In an embodiment, the drive system 100 may be controlled from an initial condition where the vehicle is stopped on grade and the drive system is holding the brakes on. The method 700 begins with a motion command 710 where the operator commands motion by applying at least 50% throttle. In response to the motion command 710, the drive system 100 ramps torque up to a commanded torque or increases to full torque (as opposed to balance torque to merely hold the vehicle stationary on grade). For example, the controller 142 can determine a torque threshold that is the amount of torque needed to achieve a desired acceleration (e.g., based on the operator-selected throttle setting). This torque threshold can be based on the weight of the vehicle, the weight of payload carried by the vehicle, the grade on which the vehicle is stopped, or the like. The drive system 100 can then increase the torque generated by the traction motor(s) of the vehicle up to the torque indicated by the operator or up to a maximum torque that the traction motor(s) can generate. In an embodiment, as shown at 712, the controller 142 may control the drive system 100 to provide the maximum amount of torque available, and automatically release the brakes at maximum torque (rather than a threshold torque for a desired velocity). In another embodiment, the controller 142 may hold the brakes on for a predetermined (e.g., non-zero) duration after applying the accelerator pedal, and then release the brakes. In this embodiment, the controller 142 employs a time delay before releasing the brakes. In another embodiment, the controller 142 may prompt an operator to release the brakes, as illustrated at 716. In particular, the controller 142 may indicate to an operator such as through an audio alert or visual display that a threshold torque is available and that the system is ready for the brakes to be released. In yet another embodiment, the operator may take over control of the braking function. For example, at 718 the controller 142 may require the operator to apply the service brakes 138, 140, after which time the brakes may be automatically released when the accelerator pedal is pressed. Balance torque can then be applied to hold zero or slightly positive speed, and torque can be increased as requested by the accelerator pedal.

Figure 13:
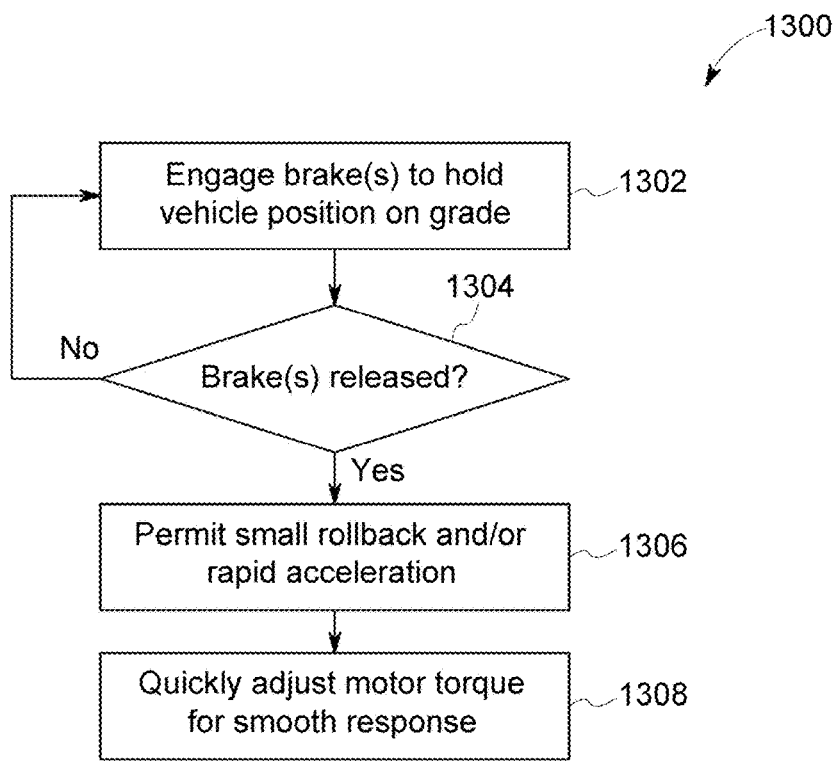
FIG. 13 illustrates a flowchart of one embodiment of a method for controlling vehicle movement from a stopped position on a grade.

FIG. 13 illustrates a flowchart of one embodiment of a method 1300 for controlling vehicle movement from a stopped position on a grade. The operations described in connection with the method 1300 can be performed or implemented by the controller 142 and/or drive system 100. The method 1300 can provide a closed loop process for controlling acceleration of the vehicle following the release of brakes while the vehicle is on a grade. At 1302, one or more brakes of the vehicle are engaged to hold the vehicle in position on a grade. The brake(s) can be engaged according to one or more embodiments of the inventive subject matter described herein, or may be engaged according to another process. At 1304, a determination is made as to whether the brakes are released. For example, the controller 142 can release the brakes responsive to receipt of operator input. If the brakes are released, then flow of the method 1300 can proceed toward 1306. Otherwise, flow of the method 1300 can return toward 1304.

At 1306, the vehicle is permitted to slightly rollback down the grade and/or rapidly accelerate subsequent to and in response to the brakes being released. For example, the controller 142 can allow the drive system 100 to disengage the brakes without generating motor torque or by generating some motor torque to permit the vehicle to roll back down the grade a small amount, such as less than a designated threshold distance of one meter (or another distance) along the length of the route, before directing the traction motor(s) to generate torque to propel the vehicle up the grade. As another example, the controller 142 can direct the drive system 100 to rapidly accelerate using the traction motor(s). The controller 142 can direct the drive system 100 to accelerate more rapidly than the drive system 100 would otherwise accelerate (e.g., when not starting movement up a grade from a stopped position) to reach an operator-selected or automatically implemented throttle position. At 1308, the torque generated by the traction motor(s) of the drive system 100 are quickly adjusted to smoothly transition from the stopped vehicle position to moving according to the operator-selected or automatically implemented throttle position. For example, the rapid acceleration implemented by the drive system 100 may be reduced without jerking or otherwise abruptly moving the vehicle while still moving the vehicle up the grade from the stopped position.

Figure 14:
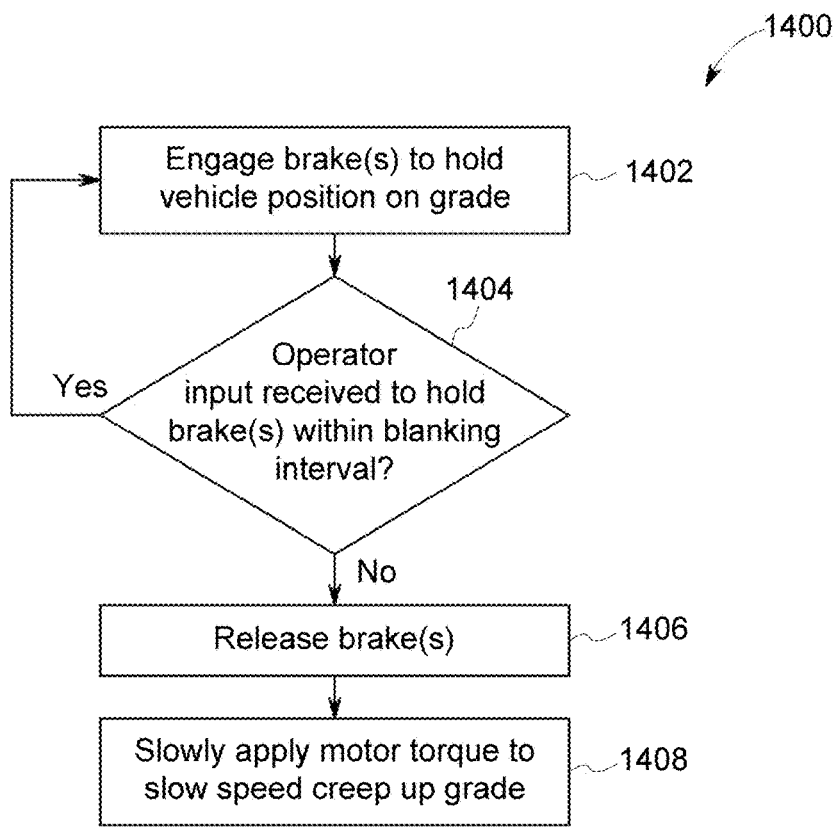
FIG. 14 illustrates a flowchart of one embodiment of a method for automated control of vehicle movement on a grade when no input is provided from an operator of the vehicle.

FIG. 14 illustrates a flowchart of one embodiment of a method 1400 for automated control of vehicle movement on a grade when no input is provided from an operator of the vehicle. The operations described in connection with the method 1400 can be performed or implemented by the controller 142 and/or drive system 100. At 1402, one or more brakes of the vehicle are engaged to hold the vehicle in position on a grade. The brake(s) can be engaged according to one or more embodiments of the inventive subject matter described herein, or may be engaged according to another process. At 1404, a determination is made as to whether an operator of the vehicle has provided input within a designated blanking interval. For example, the controller 142 can determine whether the operator has depressed a brake pedal, actuated a button, or otherwise acted to provide input to the controller 142 to keep the brake(s) engaged. The controller 142 can periodically check for operator input to determine whether the operator has provided the input to keep the brake(s) engaged at least once every blanking interval, such as every five seconds (or other time interval). If the operator has provided input to keep the brake(s) engaged, then flow of the method 1400 can return toward 1402. Otherwise, if the operator has not provided the input within the blanking interval, then flow of the method 1400 can proceed toward 1406.

At 1406, the brake(s) of the vehicle are released. At 1408, motor torque is generated to move the vehicle in a slow creep up the grade. For example, at the same time that the brakes of the vehicle are disengaged (or shortly thereafter), the controller 142 can direct the traction motor(s) of the drive system 100 to begin generating a small amount of torque to cause the vehicle to move up the grade at a slow speed (e.g., less than five kilometers per hour).

Figure 8:
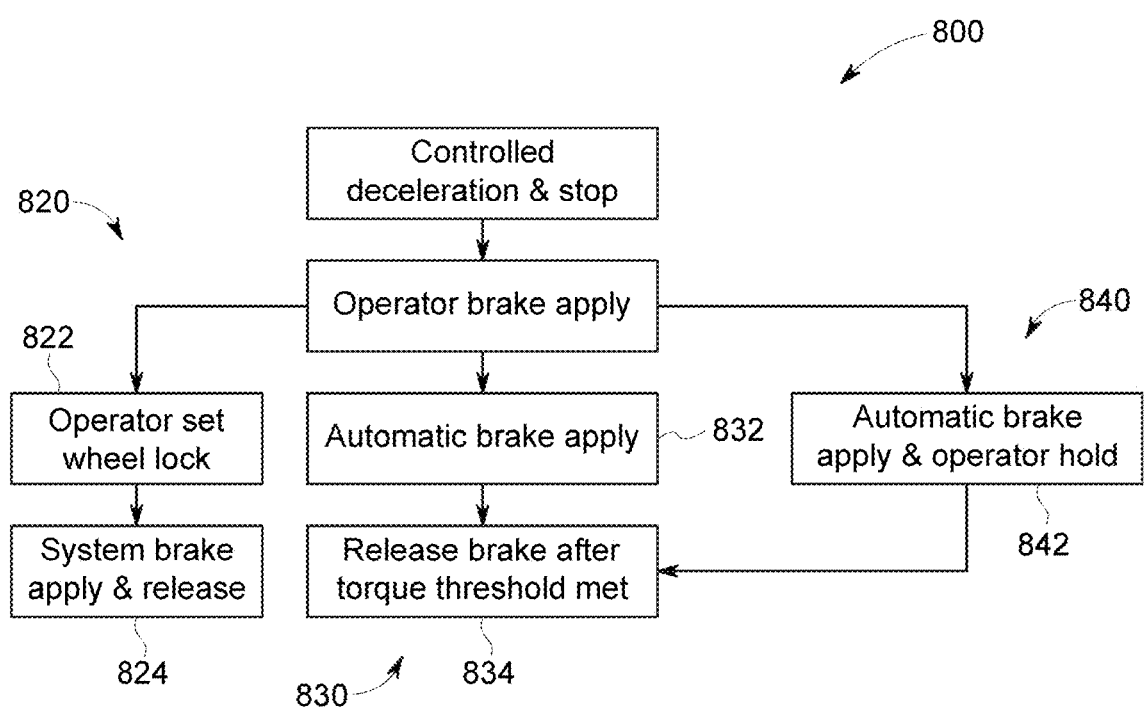
FIG. 8 is diagram illustrating a control routine for preventing vehicle rollback, according to yet another embodiment of the inventive subject matter.

In certain embodiments, both operator and automatic control can be utilized to transition from a stop to movement in a selected direction of travel without unintended rollback, as illustrated by the flowchart of a method 800 shown in FIG. 8. For example, as discussed above in connection with FIG. 4, after an operator releases the accelerator pedal, the controller 142 may determine a target maximum deceleration and control the drive system 100 to provide torque as needed to limit the maximum deceleration rate. This allows the vehicle to be reduced to a very low speed and maintain a commanded direction of travel, as illustrated at 810. An operator may then apply the service brake or park brake at zero speed to maintain the vehicle in a stationary condition, as shown at 812. From this stationary condition, various control strategies are contemplated that allow for some level of operator input when transitioning from the stationary condition to movement in a selected direction of travel.

A first control strategy 820 involves the operator setting wheel lock and releasing the previous-applied service or parking brake, at 822, in order to hold the vehicle stationary on grade. As shown at 824, both manual and automatic controls are then utilized to smoothly transition the vehicle from a stop to a selected direction of travel when an accelerator feedback is detected. In particular, the controller 142 is configured to first command the service or parking brake on when the wheel lock is on (from stop 822) and accelerator pedal feedback is above a threshold. The operator may then be prompted to disengage the wheel lock. Once, the wheel lock is turned off, the controller 142 is configured to automatically release the service or parking brake when an available torque threshold is met, as discussed in the embodiments described above (i.e., when enough torque is available to prevent rollback).

A second control strategy 830 involves the controller 142 automatically applying the service brakes, at 832, after the operator brings the vehicle to zero speed with the brakes. As discussed in the embodiments described above, at 834, controller 142 is configured to automatically release the brakes when the accelerator pedal is applied by an operator and the available torque exceeds a threshold level sufficient to prevent vehicle rollback. This control permits the vehicle to transition from the stationary condition to smooth movement in a selected direction of travel.

A third controls strategy 840 likewise involves the controller 142 automatically applying the service brakes, at 842, after the operator brings the vehicle to zero speed with the brakes. The operator may then hold the brakes on and apply the accelerator pedal to start the vehicle moving on grade. In connection with this condition, the controller 142 is configured to automatically release the brakes when the available torque exceeds a threshold level sufficient to prevent vehicle rollback, as shown at 834. In an embodiment, the brake pressure may slowly be lessened as balance torque is applied.

In an embodiment, when starting the vehicle on grade, either the operator (in a manual starting mode) or the controller 142 (in an automatic starting mode) may balance both brake and torque application to prevent rollback utilizing either a hydraulic brake that can be variably applied or a hydraulic brake with a restrictor valve. As torque is increased, the brake may be slowly eased off, for example, by decreasing the brake pressure. In this manner, the brake is operated similar to a clutch, whereby torque and brake application are balanced in order to prevent vehicle rollback and to smoothly transition to positive motion. In an embodiment, the brake may be a hydraulic brake having an associated restrictor valve controllable by the controller 142 so that brake pressure may be selectively decreased as torque is ramped. The torque ramp rate may be adjusted to match a learned brake pressure versus torque rate of the brake to maintain zero speed. The system may be configured to continue to adjust the applied torque ramp rate and brake pressure bleed down until the brake is fully released. In either case (i.e., hydraulic brake with variable apply or hydraulic brake with a restrictor valve), continued application of torque after the brake is fully released effects movement of the vehicle. If excessive vehicle movement is detected indicating a fault condition (e.g., accelerating too quickly), the brake may be automatically deployed to stop vehicle motion.

In addition to ensuring preventing vehicle rollback when stopping on grade and when starting on grade, the system and method of the inventive subject matter also allow for an increased level of control over the transition from forward motion to reverse motion, and vice versa. For example, an operator may request a direction change by switching the selector to an opposite direction at speed (e.g., forward to reverse, or reverse to forward), rather than commanding neutral when the drive system inverters are off. In this situation, the controller 142 is configured to determine if retard is entered based on a gravity force estimation and vehicle acceleration. In an embodiment, if traveling down significant grade, the controller 142 controls the drive system 100 to provide a controlled deceleration to zero speed. In particular, the controller 142 is configured to deny drive torque in a requested direction if the vehicle speed is in excess of a threshold and traveling in a direction opposite to the requested direction. Once the vehicle speed is brought below the threshold utilizing controlled deceleration, the controller 142 is configured to then apply the brake based on a received torque command, torque threshold on grade, and vehicle speed such that the brake is held on until the available torque in the new selected direction of travel is sufficient to prevent vehicle rollback.

If, however, the vehicle is traveling on a relatively flat surface, the controller 142 controls the drive system to switch to retard mode based on vehicle speed and acceleration and interprets the accelerator pedal feedback as retard command. The drive system 100 automatically brings the vehicle to a stop utilizing the service brakes based on a received torque command, torque threshold on grade, and vehicle speed such that the brake is held on until the available torque in the new selected direction of travel is sufficient to prevent vehicle rollback. If the propel command is inadequate to prevent rollback, the brakes are applied and held on to prevent rollback. If the propel command is adequate to prevent rollback, the vehicle is permitted to transition to motor in the manner discussed above.

Optionally, the drive system 100 and accompanying methods described herein can prevent vehicle rollback on a grade by applying direct current to alternating current motors of the vehicle. The controller 142 can determine a designated direct current amount from a previously determined amount or based on the payload, grade, and/or speed of the vehicle (moving up the grade). For heavier payloads, steeper grades, and/or faster speeds, the controller 142 can calculate a greater direct current amount. For lighter payloads, flatter grades, and/or slower speeds, the controller 142 can calculate a smaller direct current amount.

This determined amount of direct current is then applied or supplied to one or more alternating current motors 114, 116 of the drive system 100. In one embodiment, the amount of direct current applied to the traction motors 114, 116 is a maximum amount of direct current that the drive system 100 is capable of supplying to the traction motors 114, 116. Alternatively, the amount of direct current applied to the traction motors 114, 116 is less than the maximum amount of direct current that the drive system 100 is capable of supplying to the traction motors 114, 116. This current is applied to the traction motors 114, 116 without the brakes of the vehicle also being engaged or otherwise actuated. The direct current supplied to the traction motors 114, 116 prevents the traction motors 114, 116 from moving in an opposite direction (e.g., to cause or allow the vehicle to roll back down the grade). In this way, the direct current causes the traction motors 114, 116 to operate as brakes without any brake of the vehicle being applied. Optionally, one or more brakes of the vehicle also can be applied to hold the position of the vehicle.

The brakes that are applied (or any brakes that previously were applied) can be released with the direct current continuing to be supplied to the traction motors 114, 116. For example, the controller 142 can actuate or otherwise control a switch that controls flow of direct current to the traction motors 114, 116. Disengaging the brakes of the vehicle while maintaining application of the direct current to the traction motors 114, 116 can prevent the vehicle from rolling down the grade with the traction motors 114, 116 transitioning to slip control and generating a holding torque that counteracts gravity pulling the vehicle down the grade.

Optionally, the controller 142 can apply a maximum or 100% alternating current to the traction motors 114, 116 prior to the vehicle coming to a stop on the grade or rolling backward, and then apply one or more brakes of the vehicle before the vehicle comes to a complete stop. For example, while the vehicle is moving up the grade, the controller 142 can increase the alternating current supplied to the traction motors 114, 116 to a maximum amount that the drive system 100 can supply to the traction motors 114, 116 (without damaging the traction motors 114, 116) and then apply the brakes of the vehicle when the vehicle comes to a complete stop (e.g., when the speed of the vehicle is zero).

In another embodiment, the controller 142 can operate as a speed regulator when the vehicle is traveling up a grade and about to stop. The controller 142 can control the torque generated by the traction motors 114, 116 as the vehicle slows and is moving at slow speeds (e.g., no greater than six kilometers per hour or another speed). The controller 142 can supply current to the traction motors 114, 116 at basic excitation frequencies of the traction motors 114, 116 to control the traction motors 114, 116 and bring the vehicle to a stop on the grade, without the vehicle rolling back down the grade.

In another embodiment, the inventive subject matter provides a system and method for reducing the speed of a vehicle to zero using retarding effort provided by the traction motors of the vehicle. For example, initially, the vehicle may be moving in a desired direction of travel and an operator may request full/maximum retarding effort to stop the vehicle. If the retard request is through a lever or other means that does not require an operator to actively hold the lever to effect retarding of the vehicle, the traction motors slow the vehicle to a low, near zero speed and hold that low speed. If the retard request is through a spring-return pedal or similar mechanism, the traction motors slow the vehicle to a low, near zero speed and then the vehicle is stopped utilizing the service brakes. In an embodiment, the operator may then hold the vehicle stopped using a service brake or parking brake. In an embodiment, the operator may hold the vehicle stopped by continuous depression of the retard pedal, where applicable. In such a case, if the operator then releases the retard pedal, the controller 142 is configured to command the traction motors to maintain the stopped condition (zero speed) for a predetermined amount of time. If the vehicle is outfitted with an override switch, then after the delay accelerator pedal is allowed to control rollback speed with retard when depressed. If the vehicle does not have an override switch, then the vehicle is allowed to accelerate to an opposite motion threshold. If the operator applies the accelerator pedal, the zero-speed condition will continue to be held until a sufficient amount of torque is available to prevent rollback and get the vehicle moving in the desired direction of travel, as discussed above.

In connection with the above, in an embodiment, the vehicle may include an override switch that is configured to send an override signal to the controller 142 to enable an operator to disable the programmed control routines hereinbefore described. For example, at various times during operation of the vehicle, an operator may wish to take over full control of the vehicle rather than having the controller 142 dictate vehicle acceleration, deceleration, stoppage and movement. In particular, an operator may want to be able to coast in a direction opposite the selected direction of travel, such as when turning around on slight grade. In such a situation, the operator can depress the override button or otherwise enable override to disable the automatic brake-apply feature hereinbefore described and allow coast-back. In an embodiment, the controller 142 may still be configured to automatically apply the brakes or utilize the traction motors to slow the vehicle if the coast-back resulting from override results in an over-speed or over-acceleration condition (i.e., a speed or acceleration exceeds a safe threshold).

In an embodiment, the system of the inventive subject matter also includes a redundant braking or notification function that is automatically carried out in the event of drive system failure or fault. For example, if the drive system card fails or powers down suddenly while the vehicle is on grade, roll back will occur if the system does not apply the brakes. In such a scenario, the operator may not be paying attention and may assume that the brakes will automatically be applied to prevent rollback in accordance with the automatic control discussed above. The system may therefore be outfitted with a redundant braking function that is carried out automatically when drive system failure is detected and when vehicle speed exceeds a threshold before or after a rollback condition. In an embodiment, the brakes may be applied to control deceleration to zero speed. In an embodiment, the system may also be configured to output an audible or visual warning to an operator to let the operator now that the anti-rollback control described herein will not function. This provides an operator with an alert that the drive system will not be able to apply the brakes and that manual action is necessary to prevent a rollback condition. This safeguard ensures that an operator is paying attention and alerts an operator that the automatic, anti-rollback features are disabled.

In an embodiment, the control system of the inventive subject matter, by utilizing the functions hereinbefore described, is configured to provide for the controlled deceleration of a vehicle and automatic engagement of the service brakes while the vehicle is still moving in a desired direction of travel, to prevent vehicle rollback when coming to a stop. That is, the service brakes are applied in dependence upon vehicle acceleration/deceleration prior to crossing zero speed. The system of the inventive subject matter is further configured to prevent rollback when starting a vehicle from a stop on grade by determining a torque threshold to achieve a desired acceleration (rather than velocity) or by performing a maximum or preset target torque start instead of a threshold torque start. As a result of the control strategies presented herein, vehicles employing the control system of the inventive subject matter are more user friendly and require less skill to operate. In addition, the control system of the inventive subject matter may be retrofit into existing vehicles by modifying control software, and without significant hardware upgrades or modifications.

In an embodiment, a method for controlling a vehicle is provided. The method includes the steps of, while traveling on grade in a selected direction of travel, controlling at least one traction motor of the vehicle to provide a controlled deceleration of the vehicle, and automatically applying a service brake of the vehicle while the vehicle is moving in the selected direction of travel.

In another embodiment, a system is provided. The system includes a control unit configured to be electrically coupled to a drive system of a vehicle, the drive system including at least one traction motor for providing motive power to the vehicle, and a service brake associated with at least one wheel of the vehicle. In the absence of a command to provide the motive power in the selected direction of travel, the control unit is configured to automatically apply the service brake while the vehicle is moving in a selected direction of travel to prevent rollback of the vehicle.

In one embodiment, the controller 142 also is operable to prevent vehicle rollback when on grade or when engaging an overburden pile, through the automatic application of the service brakes 138, 140. With existing LHD vehicles 10, when engaging an overburden pile, for example, after an operator releases the accelerator pedal, and before he/she can manually engage the service brakes, the spring tension in the bucket arm 18 and the incline the vehicle was on in the burden pile can cause the vehicle to inadvertently roll backward several feet. According to an embodiment of the inventive subject matter described herein, however, the control unit or controller 142 is configured to automatically apply the service brakes 138, 140 to hold the vehicle 10 at zero speed or near zero speed on grade and/or when pushing into an overburden/burden pile when a rollback condition is detected, without input from an operator of the vehicle, in order to prevent such inadvertent rollback. As used herein, "automatically" means without input or intervention from an operator of the vehicle. As used herein, "rollback condition" means a state or condition where vehicle movement in a direction opposite or different from a selected or desired direction of travel is possible in the absence of braking or depression of the accelerator pedal of the vehicle.

For example, in an embodiment, the controller 142 is configured to continuously or intermittently monitor or detect a selected direction of travel of the vehicle (i.e., forward or reverse) and the speed of the traction motor (e.g., one or more of the traction motors), and to immediately command the service brakes 138, 140 associated with the wheels 118, 120 of the vehicle 10 to engage when a rollback condition is detected. In an embodiment, a "rollback condition" is present when the traction motor speed, in a direction opposite or different from the selected direction of travel, exceeds a predetermined threshold. As used herein, "opposite or different from the selected direction of travel" means, for example, that the traction motor is rotating in a direction opposite than that required to effect movement of the vehicle in the selected direction of travel, or in a mode (e.g., regenerative braking mode) other than that required to propel the vehicle in the selected direction of travel.

In an embodiment, the threshold motor speed opposite or different from the direction of travel that prompts automatic application of the service brakes to prevent rollback may be between about 0 rpm and about 100 rpm. In another embodiment, the threshold motor speed may be between about 10 rpm and about 90 rpm. In another embodiment, the threshold motor speed may be between about 20 rpm and about 80 rpm. In another embodiment, the threshold motor speed may be between about 30 rpm and about 70 rpm. In another embodiment, the threshold motor speed may be between about 40 rpm and about 60 rpm. In yet another embodiment, the threshold motor speed may be about 50 rpm in a direction opposite the selected direction of vehicle travel.

In an embodiment, the vehicle 10 has a fixed gear ratio of approximately 90:1, such that a 50 rpm threshold (in a direction opposite the selected direction of travel) to engage the service brakes would not be perceptible as movement to an observer or operator. In an embodiment, the controller 142 is configured to apply the service brakes 138, 140 to prevent rollback within approximately 100 milliseconds of detecting the vehicle rollback condition. In an embodiment, the brakes 138, 140 may be maintained by the controller 142 in a fully on or engaged state until the selected direction of travel is changed by an operator to match the direction of the traction motor and/or the accelerator pedal is depressed or actuated by an operator.

Figure 9:
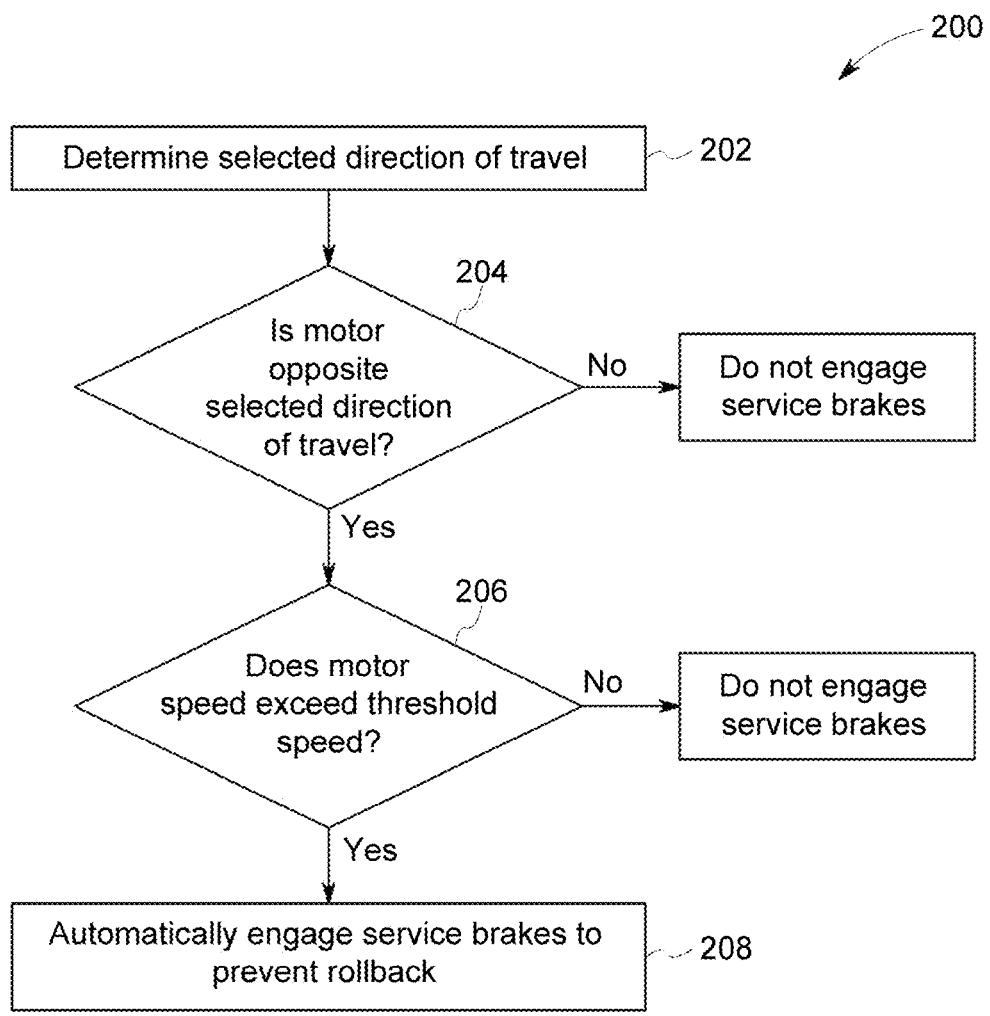
FIG. 9 is a diagram illustrating a control routine for preventing vehicle rollback, according to an embodiment of the inventive subject matter.

Referring now to FIG. 9, a method 200 of controlling a vehicle to prevent vehicle rollback according to an embodiment of the invention is illustrated. As shown therein, at 202, a selected direction of travel for the vehicle is detected and logged by the controller 142. The speed and direction of at least one of the traction motors (e.g., motors 114, 116 of the vehicle 10 is also monitored. At 204, the controller 142 determines whether or not the direction of the traction motor is opposite the selected direction of travel. If not, no automatic action regarding the application of service brakes is taken. If the traction motor direction is opposite the selected direction of travel, the controller 142 then (or simultaneously) determines, at 206, whether the traction motor speed exceeds a threshold speed. If not, no automatic action regarding the application of service brakes is taken. If, however, the detected speed of the traction motor in a direction opposite the selected direction of travel exceeds the threshold speed, then the controller 142 automatically engages the service brakes at step 208 to prevent rollback of the vehicle. As discussed above, the service brakes remain engaged until an operator of the vehicle changes the selected direction of travel to match the traction motor direction and/or the accelerator pedal is depressed by the operator.

Figure 10:
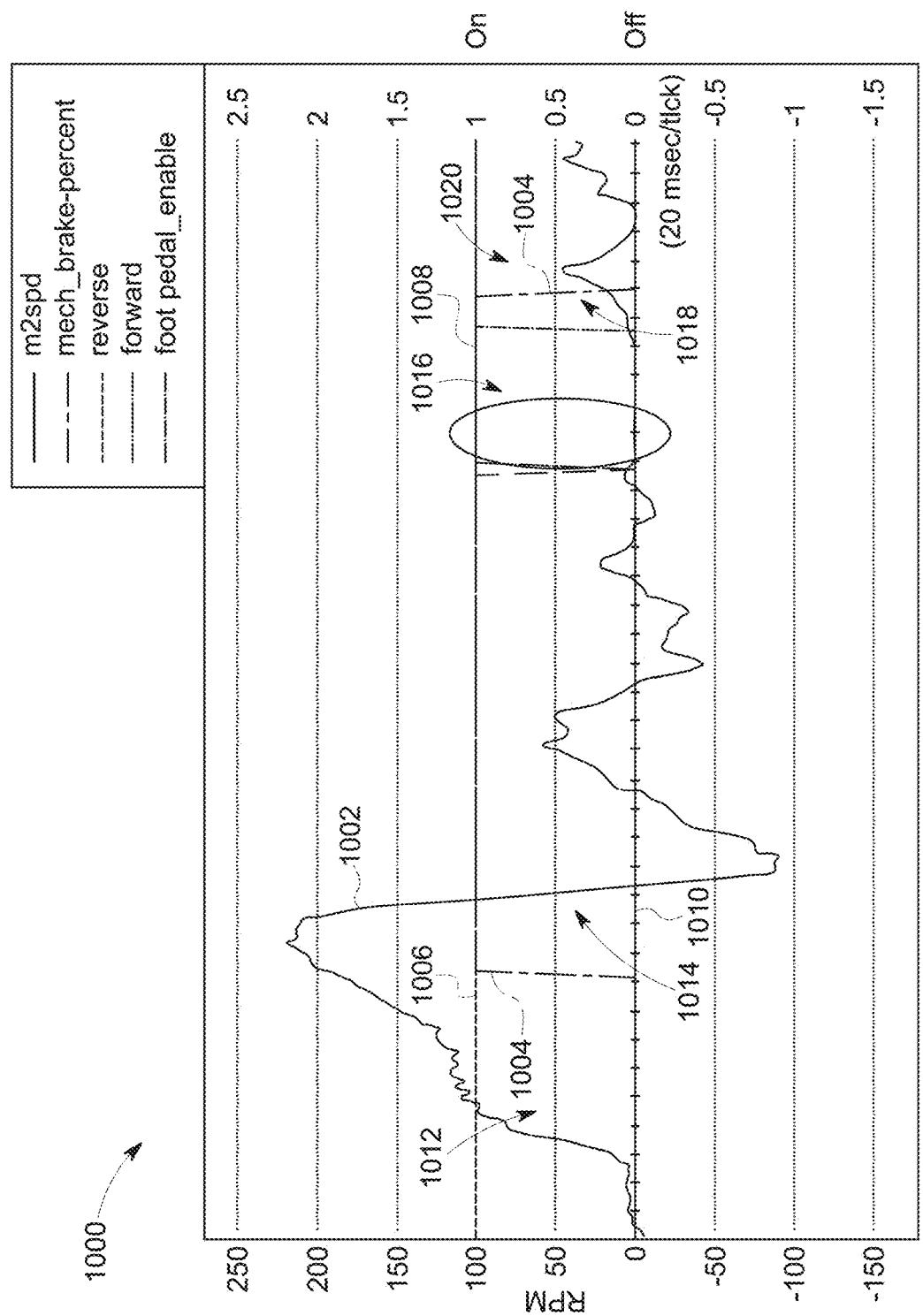
FIG. 10 is a graph illustrating operation of the system for preventing vehicle rollback, according to an embodiment of the inventive subject matter.

FIG. 10 shows a graph 1000 illustrating operation of the vehicle rollback prevention system, where line 1002 represents motor speed, line 1004 represents braking percent ON, line 1006 represents a "REVERSE" selected direction of travel, line 1008 represents a "FORWARD" selected direction of travel, and line 1010 represents depression of an accelerator pedal. At 1012, the forward motor speed exceeds the threshold motor speed of 50 rpm while the vehicle is operating in a selected reverse direction of travel. At 1014, the service brakes are then automatically actuated to 100% engagement/on by the controller to prevent vehicle rollback. At 1016, an operator (or the controller automatically) shifts the vehicle from reverse to forward, and at 1018 depresses the accelerator pedal to move the vehicle forward. At 1020, the controller then disengages the service brakes.

In an embodiment, the control system or controller of the present invention, by utilizing the functions hereinbefore described, is configured to automatically engage the service brakes whenever a rollback condition is sensed. This prevents the vehicle from rolling backwards on grade or when engaging an overburden pile or the like without the need for operator input or action, and ensures that when the vehicle is in the forward or reverse direction, movement of the vehicle in a direction other than in the selected direction is not possible. By managing vehicle movement in this manner, the control system of the inventive subject matter ensures that rollback or vehicle movement in a direction other than in a selected direction is prevented. As a result, vehicles employing the control system of the inventive subject matter are more user friendly and require less skill to operate. In addition, the control system of the inventive subject matter may be retrofit (e.g., added) into existing vehicles by modifying control software (e.g., to direct the controller to operate as described herein), and without significant hardware upgrades or modifications.

In an embodiment, a method for controlling a vehicle is provided. The method includes the steps of determining a selected direction of travel of the vehicle, monitoring a direction of operation of a motor of the vehicle, monitoring a speed of the traction motor, and automatically applying a service brake of the vehicle when a rollback condition is detected to prevent rollback of the vehicle. In an embodiment, the rollback condition is present when the direction of operation of the traction motor is different from the selected direction of travel. In an embodiment, the rollback condition is present when the speed of the traction motor exceeds a threshold speed. In an embodiment, the vehicle is a load-haul-dump vehicle. In an embodiment, the service brakes are hydraulic or pneumatic service brakes. In an embodiment, the method may also include the step of disengaging the service brake when the selected direction of travel matches the direction of operation of the traction motor and an accelerator pedal of the vehicle is depressed. In an embodiment, the threshold speed is between about 0 rpm and about 100 rpm. In yet other embodiments, the threshold speed is between about 40 rpm and about 60 rpm. In yet other embodiment, the threshold speed is about 50 rpm. In an embodiment, the vehicle has a fixed gear ratio of approximately 90:1.

In another embodiment, a system is provided. The system includes a control unit configured to be electrically coupled to a drive system of a vehicle, the drive system including at least one traction motor for providing motive power to the vehicle, and a service brake associated with at least one wheel of the vehicle. The control unit is configured to automatically apply the service brake when a rollback condition is detected to prevent rollback of the vehicle. In an embodiment, the control unit is configured to monitor a direction of operation of the at least one traction motor and a speed of the at least one traction motor. In an embodiment, the rollback condition is present when the direction of operation of the at least one traction motor is different from a direction of operation of the traction motor corresponding to a selected direction of travel of the vehicle, and the speed of the at least one traction motor exceeds a threshold speed. In an embodiment, the control unit is configured to disengage the service brake when the selected direction of travel matches the direction of operation of the at least one traction motor and an accelerator pedal of the vehicle is depressed. In an embodiment, the service brake is pneumatic or hydraulic brake. In an embodiment, the threshold speed is about 50 rpm. In an embodiment, the vehicle has a fixed gear ratio of approximately 90:1.

In yet another embodiment, a vehicle is provided. The vehicle includes a drive system including a traction motor connected in driving relationship to a wheel of the vehicle, the traction motor being configured to provide motive power to propel the vehicle in a selected direction of travel in a propel mode of operation, a controller electrically coupled to the drive system, and a friction brake associated with at least one wheel of the vehicle. The controller is configured to automatically engage the friction brake when a rollback condition is detected to prevent rollback of the vehicle. In an embodiment, the controller is configured to monitor a direction of operation of the traction motor and a speed of the traction motor. In an embodiment, the rollback condition is present when the direction of operation of the traction motor is different from the selected direction of travel of the vehicle, and the speed of the at least one traction motor exceeds a threshold speed. In an embodiment, the threshold speed is about 50 rpm and the vehicle has a fixed gear ratio of approximately 90:1. In an embodiment, the vehicle is a load-haul-dump vehicle, Additional embodiments of the inventive subject matter relate to control systems and methods (e.g., braking control) for controlling transition from friction brakes to electrical effort (and vice versa) in a vehicle, to automate operation of the vehicle for starts and stops while loaded on an inclined (greater than zero degrees) grade. According to one aspect, for example, a control system (and related method) is configured for concurrent control of an electric drive system and a friction brake system of a vehicle to prevent rollback when the vehicle is operated to move from a stopped position on an inclined grade. According to another aspect, a control system (and related method) is configured for concurrent control of an electric drive system and a friction brake system of a vehicle, while traveling on an inclined grade, to bring the vehicle to a stop and hold the vehicle stopped.

Figure 11:
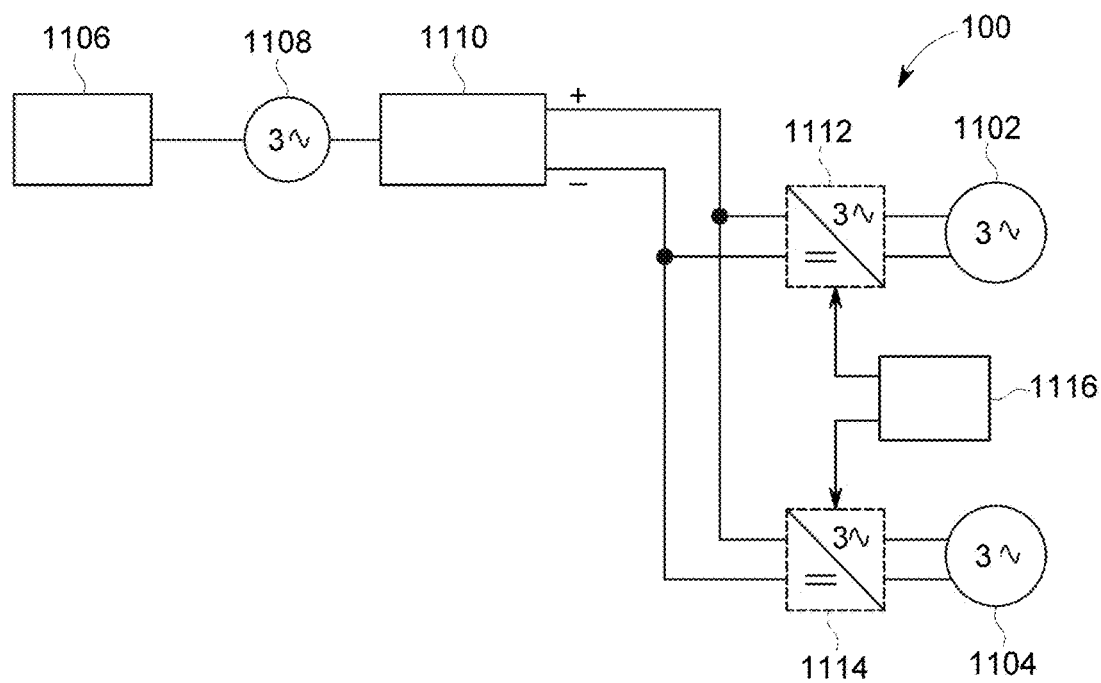
FIG. 11 is a schematic diagram of an electric drive and retarding system, according to an embodiment.

Another embodiment of the electric drive system 100 is shown in FIG. 11. The electric drive system 100 is at least partially housed within the vehicle 10, 30, and comprises a three-phase alternating current (AC) generator/alternator 1108 that is coupled to be mechanically driven by an engine 1106 (e.g., a diesel engine). An AC output of the generator 1108 is fed into one or more rectifiers 1110, which are configured to convert the AC output of the generator/alternator 1108 to a direct current (DC) output. The DC output of the rectifiers 1110 is supplied to a DC bus, which (among other loads) feeds into a set of inverters 1112, 1114. The inverters 1112, 1114 are configured to convert DC power from the DC bus into controlled three-phase, variable frequency AC power. Outputs of the inverters 1112, 1114 are electrically connected to electric motors 1102, 1104 (respectively), and the AC power output by the inverters 1112, 1114 has a waveform suitable for driving the electric motors 1102, 1104. The electric motors 1102, 1104 are operably coupled to the drive wheels (e.g., rear wheels) of a first set of wheels of the vehicle. For example, the traction motors 1102, 1104 may be three-phase, AC induction wheel motors. If a second set of wheels of the vehicle are drive wheels, then the electric drive system 100 can include additional inverters and electric motors coupled similarly to the inverters 1112, 1114 and motors 1102, 1104 in FIG. 11.

As further shown in FIG. 11, a drive system control unit or controller 1116 is electrically coupled to the electric drive system 100. For example, the drive system control unit may be connected to the inverters 1112, 1114. The drive system control unit 1116, among other tasks, is configured to determine and send a desired torque request signal to the inverters 1112, 1114. The torque request signal is processed by the control unit for the inverters 1112, 1114 to drive the traction motors 1102, 1104 to the desired torque output magnitude, and in the desired rotational direction corresponding to the intended direction of vehicle movement. The control unit is also configured to control the traction motors 1102, 1104 to provide retarding tractive effort to the wheels (e.g., rear wheels) to slow or stop the vehicle. In particular, when operating in an electric braking mode, also known as electric retarding, the electric motors 1102, 1104 are reversed to act as generators, and the drive wheels of the vehicle drive the electric motors 1102, 1104. Driving the traction motors 1102, 1104 places a torque on the drive wheels and causes them to slow, thus braking the vehicle. In an embodiment, the control unit 1116 includes one or more microprocessors operating according to a set of stored instructions to provide for vehicle control, as discussed in detail below and elsewhere herein.

Figure 12:
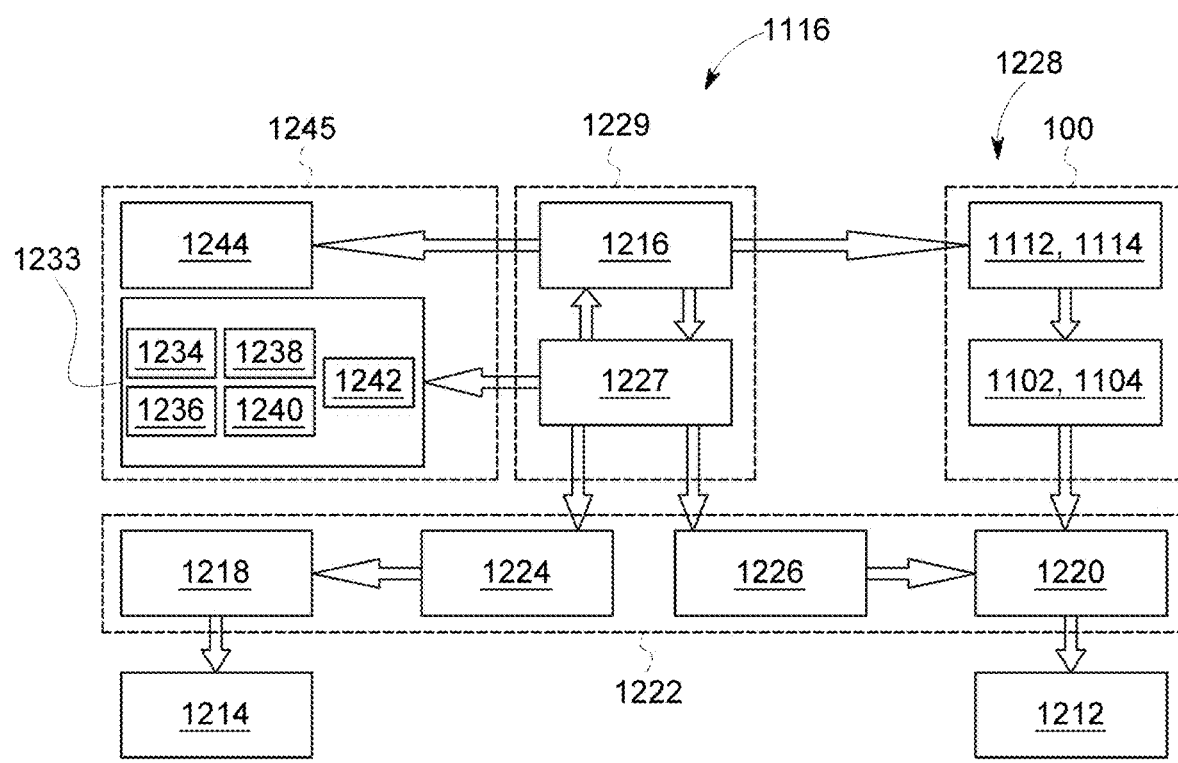
FIG. 12 is a block diagram illustrating a control system including hydraulic friction brakes and an electric retarder, according to an embodiment.

FIG. 12 shows an embodiment of the control system (e.g., braking control system) or control unit 1116 in more detail. The control system 1116 comprises a friction brake system 1222 that includes a first (e.g., rear) friction brake unit 1220 (e.g., friction brake actuation unit) associated with a first set of wheels 1212 (e.g., rear wheels) of the vehicle and a second (e.g., front) friction brake unit 1218 (e.g., friction brake actuation unit) associated with the second set of wheels 1214 (e.g., front wheels) of the vehicle. In an embodiment, a friction brake system 1216 is a hydraulic brake system, which further includes a first (e.g., rear) brake solenoid valve 1226 that is controllable to control the pressure of hydraulic fluid to the first friction brake unit 1220, and a second (e.g., front) brake solenoid valve 1224 that is controllable to control the pressure of hydraulic fluid to the second friction brake unit 1218. In other embodiments, other means for actuating the first and second friction brake units 1218, 1220 may also be utilized without departing from the broader aspects of the inventive subject matter. In either (or any) embodiment, each friction brake unit may include, for example, respective components for controllably applying a friction load to a moving part associated with a wheel 1212, 1214, e.g., brake pads operably coupled with a vehicle axle or brake disc/rotor, hydraulically-actuated calipers for applying a force to the brake pads against the disc/rotor, and so on. The control system 1116 further includes a friction brake control unit 1227 that is configured to control application of the first and second (e.g., rear and front) friction brake units 1220, 1218 at least partially in response to operator inputs, such as the depression of a brake pedal.

In an embodiment, the drive system control unit 1116 and friction brake control unit 1227 are electrically coupled to one another and may be generally referred to as one or more controllers 1229. While the drive system control unit 1116 and friction brake control unit 1227 are illustrated as separate components in FIG. 12, the control units 1116, 1227 may be integrated into a single control unit/controller/processor without departing from the broader aspects of the inventive subject matter.

As further shown in FIG. 12, the drive system control unit 1116 is electrically coupled to a drive-train 1228 of the vehicle 10, which includes the electric drive system 100, e.g., engine 1106, generator 1108, rectifier 1110, inverters 1112, 1114, and drive motors 1102, 1104 (AC induction wheel motors as shown in FIG. 11, or otherwise). When braking the vehicle 10 in an electric retarder braking mode, the control unit 1116 commands the electric drive system 100 (acting in effect as an electric retarding system that includes the inverters 1112, 1114, and motors 1102, 1104) to provide a requested desired vehicle retarding torque to the wheels.

As also shown in FIG. 12, one or both of drive system control unit 1116 and/or the friction brake control unit 1227 may be configured to receive inputs from an operator control 1233, e.g., an ignition switch 1234, an accelerator position transducer 1236, a brake pedal position transducer 1238, and/or a gear selector 1240, for operating the electric motors 1102, 1104 for driving and braking the vehicle 10. The ignition switch 1234 is operable to turn the vehicle on and off. The accelerator position transducer 1236 is configured to detect a position of an accelerator pedal or other actuator. The brake pedal position transducer 1238 is configured to detect a position of a brake pedal or other actuator. The gear selector 1240 provides a means for permitting an operator to select an intended or desired direction of vehicle movement, such as forward movement or reverse movement. In addition or alternatively, the operator control may comprise another type of input interface 1242, e.g., steering wheel or other steering controls, touchscreen or other computer interface, control input from a control system or autonomous controller, and so on. As further shown in FIG. 12, a display 1244 may be electrically coupled to the drive system control unit 1116 to allow an operator of the vehicle 10 to view status information relating to various vehicle systems. The display 1244 and operator control(s) 1233 collectively form an I/O (input/output) system 1245.

With further reference to FIG. 12, the control system 1116 is configured to automate the operation of the vehicle when starting and stopping, while loaded, on grade. In operation, when an operator of the vehicle (the operator may be a person or an autonomous controller) requests that the vehicle come to a stop, or that the vehicle moves in a certain direction (e.g., in either case through actuation of an operator control), the drive system control unit 1116 communicates with the friction brake control unit 1227 to control a transition from friction brakes to electrical effort/propulsion, and vice versa. In particular, the control system includes an interface between the drive system control unit 1116 and the friction brake control unit 1227 that allows the drive system control unit 1116 (e.g., in response to feedback or other information from the electric drive system 100) to request a specific braking effort from the friction brake control unit 1227. This interface also allows the drive system control unit 1116 to request from the friction brake control unit 1227 that friction braking effort be added or removed (i.e., increased or decreased). Thus, in embodiments, the drive system control unit 1116 is configured to communicate with the friction brake control unit 1227 to control an amount of a friction brake application during vehicle stops and starts. For example, the drive system control unit 1116 may be configured to communicate with the friction brake control unit to at least partially automatically control the amount of the friction brake application during vehicle stops and starts on an inclined grade on which the vehicle is positioned. (At least partial automatic control means fully automatic control, or automatic control responsive to, and based in part on, an operator input, e.g., a degree or rate of braking or acceleration that is responsive and proportional to a degree of change in position of a brake pedal or accelerator pedal.)

In connection with the above, the drive system control unit 1116 is configured to utilize system parameters to calculate the force needed to hold the vehicle 10 on the given inclined grade. The drive system control unit 1116 then determines when to request the friction brakes be released or more friction braking effort be added in dependence upon this determined force. The force may be determined based on various methods as outlined in the aforementioned U.S. patent application Ser. No. 14/464,226, filed 20 Aug. 2014. Alternatively or additionally, the control unit 1116 may be configured for the force to be determined based on information of the inclined grade as generated by an on-board inertial measurement unit, information on vehicle mass (e.g., determined from a weighing station, or from on-board, physics-based calculations from sensor data relating to vehicle acceleration under known conditions), other vehicle/system parameters (e.g., vehicle wheel radius), etc.

In embodiments, the control system 1116 also is configured to provide anti-rollback capabilities. In particular, the drive system control unit 1116 is configured to determine a torque level needed to move the vehicle from stop to up an inclined grade (i.e., the vehicle is stopped while on the inclined grade, and is then controlled to move up the inclined grade). The torque level may be determined based on the force, e.g., the torque level would be a level that at least just exceeds the force. Upon calculating the torque required (or at some point subsequent to calculating the torque), the drive system control unit 1116 communicates with the friction brake control unit 1227 to request removal of a friction brake application (i.e., amount of friction brake application=zero) to commence motion of the vehicle in the desired direction, without substantial rollback. Thus, in embodiments, the drive system control unit 1116 is further configured, responsive to an input from an operator control (for the vehicle to move up down the inclined grade), to communicate with the friction brake control unit 1227 to remove the friction brake application and concurrently control the electric drive system 100 to provide the electric motive power according to the torque level that is determined, for the vehicle to move from stop to up (or down) the inclined grade without substantial vehicle rollback.

The drive system control unit 1116 may be configured to communicate with the electric drive system and the friction brake control unit so that an amount and rate at which the friction brake application is removed (by the friction brake control unit controlling the friction brake system) is automatically controlled to be proportional or equivalent to an amount and rate at which additional torque is provided (by the electric drive system as controlled by the drive system control unit). For example, as the friction brake application is reduced by a particular amount, the torque is concurrently increased by an amount at least sufficient to offset the lowered friction brake application to prevent vehicle rollback until the friction brake application is completely removed, at which time additional torque is generated for the vehicle for move forward. (Without "substantial" vehicle rollback includes no vehicle rollback, and vehicle rollback below a threshold that is deemed to still meet designated safety guidelines, e.g., rollback of no more than 0.3 meters for certain haul truck applications.)

In other embodiments, the control system is alternatively or additionally configured to provide controlled stop capabilities, such as when a vehicle 10 is operating on grade. In particular, the drive system control unit 1116 is configured to calculate the force needed to hold the vehicle 10 on the given inclined grade, and, responsive to an input from an operator control for the vehicle to come to a stop while moving on the grade, to communicate with the friction brake control unit 1227 to increase the amount of friction brake application, in dependence at least in part upon the force that is determined, to bring the vehicle to a stop and hold the vehicle stopped on the grade. The drive system control unit 1116 may be further configured to calculate the force needed to bring the vehicle to a stop in the first place, and to simultaneously communicate with the friction braking control unit 1227 to request an amount (and rate) of friction brake application to stop and then hold the vehicle the inclined grade. Generally, such calculations may take into account vehicle mass, current rate/velocity of travel, degree of grade incline, etc. For example, the braking force required to bring a vehicle to a stop while traveling up a grade would depend on vehicle mass and rate of deceleration (change in velocity from current velocity to zero over a given distance) less a factor due to rolling friction/resistance less a factor due to the force of gravity on the grade. The braking force then required to then hold the vehicle stopped on the grade would depend on vehicle mass, the grade, etc. as discussed above.

In embodiments, application of the friction brake system to bring a vehicle to a stop and hold the vehicle stopped on an inclined grade is concurrent with a reduction in electric retarding. Here, the drive system control unit 1116 is configured to calculate the force needed to hold the vehicle 10 on the given inclined grade, and, concurrently with a reduction in the electric retarding, to communicate with the friction brake control unit to increase the amount of friction brake application, in dependence at least in part upon the force that is determined, to bring the vehicle to a stop and hold the vehicle stopped on the grade. Thus, as the vehicle is moving up an inclined grade, the drive system control unit 1116, responsive to an input from an operator control for the vehicle to come to a stop, may be configured to first initiate electric retarding, and as the retarding effort by the electric drive system is reduced as the vehicle slows, concurrently communicate with the friction brake control unit to increase the amount of friction brake application. After the vehicle comes to a complete stop, the amount of electric retarding may be zero, and in such a case the amount of friction brake application will be sufficient to hold the vehicle stopped on the inclined grade. The drive system control unit 1116 may be configured to automatically control the amount and rate by which the friction brake application increases concurrently with the decrease in electric retarding such that (i) an overall deceleration profile (change in velocity over time from a current non-zero velocity to zero velocity) of the vehicle is linear (and thereby smooth-seeming to human operators) and (ii) proportional in terms of rate to one or more inputs from an operator control, e.g., the drive system control unit would control the decrease in electric retarding and concurrent increase in friction braking to provide faster deceleration responsive to an input from an operator control for a higher degree/rate of braking versus an input from the operator control for a lower degree/rate of braking.

As described herein, embodiments may include systems and methods for determining a direction of movement of a vehicle. The determined direction of movement may then be compared to the desired direction of travel (or presumed direction of travel), which is also referred to herein as the selected travel direction. The direction of movement may be determined after the brake is released or after the movement is initiated. For example, the direction of movement may be determined as the vehicle begins to move from the stopped position, after the brake is released but just prior to the vehicle moving, or after the movement is initiated but just prior to the movement being detected.

Generally, provided, in some non-limiting embodiments or examples, is a method of determining that a vehicle, such as a train, is traveling in a direction contrary to a presumed direction of travel based on prior movement and/or a setting of a vehicle control, such as a reverser handle. Embodiments may be particularly suitable for circumstances in which GPS coverage is not available or is not reliable.

Assume a train traveling in a forward uphill direction, with the reverser handle in a forward state or position, comes to a stop on a hill in an area where GPS coverage is not available. Since the controller of the vehicle system can include, as an operating variable thereof, a direction of travel of the vehicle system (i.e., a direction of travel variable) that remains active, and since the reverser handle remains in the forward state or position, when the vehicle system beings to move again, the controller assumes from these inputs that the vehicle system continues moving in the forward, uphill direction. However, it is possible that the vehicle system, unbeknownst to the controller, beings moving (rolling) backwards due to the force of gravity acting on the vehicle system since a wheel tachometer sensor of the vehicle system can only determine movement and not direction.

To overcome this problem, one or more embodiments can include a controller that is programmed or configured to determine the direction of travel of the vehicle system based on the physics of the situation. The controller can receive input from a number of locomotive interfaces including, without limitation, a throttle and a brake setting sensor, the latter of which can provide to the controller an indication of the present amount of braking being applied by the brakes, e.g., between 0% and 100% braking, and can determine the forces acting on the vehicle system. By coupling these inputs with data indicating an uphill grade, the controller can determine that motion detected via, for example, the wheel tachometer sensor is in the downhill direction given that there is not enough force applied to move the vehicle system uphill.

For example, assume the vehicle system controller determines the vehicle system is moving in a forward (or reverse) direction, on an uphill grade or slope at a geographical location where there is no GPS coverage based on the reverser handle being in a forward (or reverse) state or position and with reference to a route database that the controller can access to route movement of the vehicle system on the route, i.e., as the vehicle system travels on the route, the controller can update the position of the vehicle system in the route database based on the output of a train wheel tachometer sensor, the output of which the controller can convert into a distance traveled by the vehicle system on the route. To this end, the controller and the vehicle system wheel tachometer sensor operate in the nature of an odometer. The route database can also include grade or slope data at locations along the path of route.

Next, assume the vehicle system stops on the uphill grade or slope. When the controller determines from the wheel tachometer sensor that the vehicle system wheel is once again moving (rotating), the controller can be programmed or configured to determine if the setting of the vehicle system brakes (i.e., the force of braking applied by the vehicle system brakes) and/or the power or force applied by the traction motor of the vehicle system locomotive is/are greater than a force of gravity acting to pull the vehicle system in the downhill direction and, if not, the controller can determine that the vehicle system is moving in a reverse, downhill direction. On the other hand, if the controller determines that the setting of the vehicle system brakes (i.e., the force of braking applied by the vehicle system brakes) and/or the power or force applied by the traction motor of the vehicle system locomotive is/are greater than a force of gravity acting to pull the vehicle system in the downhill direction, the controller can be programmed or configured to determine that the vehicle system is moving in the forward, uphill direction.

In some non-limiting embodiments or examples, the controller can be programmed or configured to validate the predicted direction of travel. In an example, one check may be determining that movement after the stop has begun within a short time of releasing from the stop (just a few seconds). This can confirm that inputs to the controller indicating little or no throttle and/or little or no brakes applied are valid and align with the behavior of the vehicle system. In another example, the movement direction may be validated by measuring the actual acceleration of the vehicle system and comparing it to the predicted acceleration if the vehicle system where accelerating uphill after the stop which would strengthen the validity of the predicted direction determination (acceleration downhill would be higher than acceleration uphill).

The direction of travel variable stored in the controller can then be changed to the predicted direction of travel, in this example, reverse, and all navigation by the controller can then be based on this predicted direction of travel. This would allow the controller to provide proper speed and movement protection targeted for the actual direction of movement. The rollback movement can be detected quickly and any enforcement action that is necessary can be applied in a timely manner. This would improve safety and avoid a derailment or accident. An additional means to solve this problem could be to use a front facing camera coupled with machine vision as a sensor input to quickly determine a direction of movement.

Figure 15:
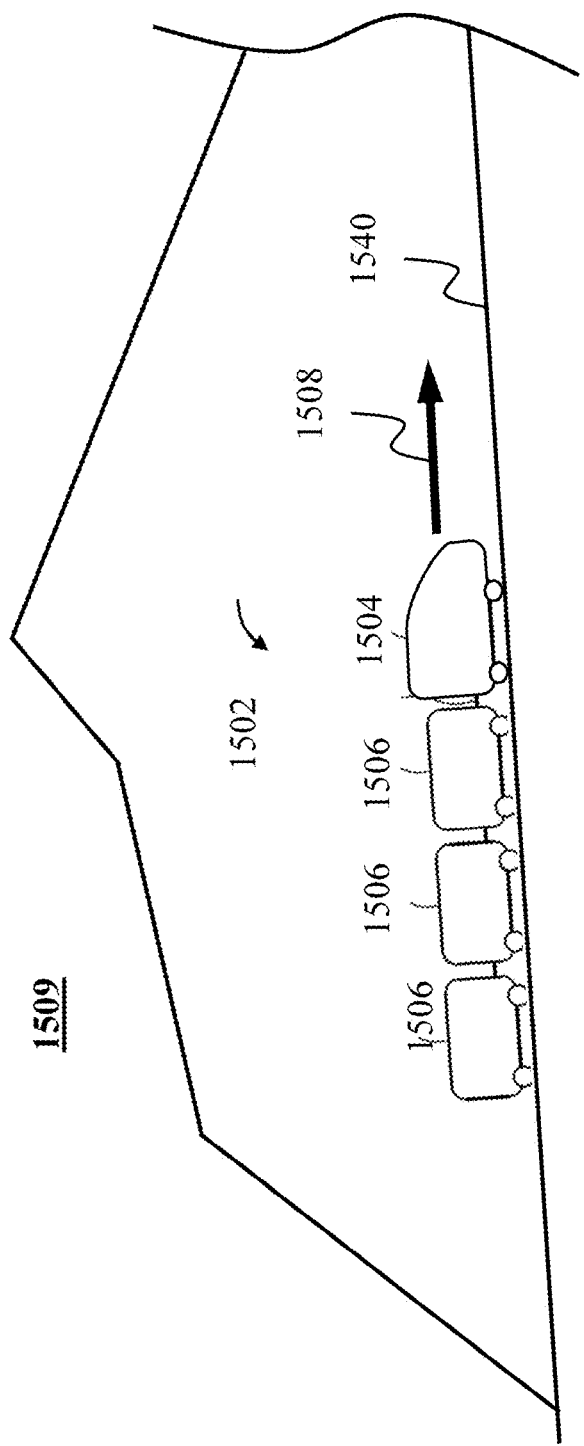
FIG. 15 is a schematic view of a vehicle system at a stopped position along a route in which the vehicle system is configured to move uphill from the stopped position.

FIG. 15 is a schematic illustration of a vehicle system 1502 in accordance with one embodiment that is located at a stopped position along a route 1540. The vehicle system 1502 includes a propulsion-generating vehicle 1504 and one or more non-propulsion generating vehicles 1506. In some embodiments, the vehicle 1504 can be a locomotive, and the vehicles 1506 can be rail cars. Although the vehicle system 1502 is shown as including multiple vehicles in FIG. 15, the vehicle system 1502 may include only a single vehicle 1504 in some embodiments. As such, the terms "vehicle system" and "vehicle" may be used interchangeably.

As shown, the vehicle 1504 is a lead vehicle of the vehicle system 1502 (e.g., train) and the vehicles 1506 are remote vehicles. One or more of the remote vehicles 1506 may be a propulsion-generating vehicle. For the purpose of the following description, the vehicle 1504 will be considered the lead vehicle of the vehicle system 1502. In FIG. 15, the vehicle system 1502 is traveling in a direction of travel 1508 that is uphill in a geographical region 1509. The geographical region 1509 may be hilly or mountainous such that the region 1509 has no GPS coverage or GPS coverage that is unreliable or intermittent.

Figure 16:
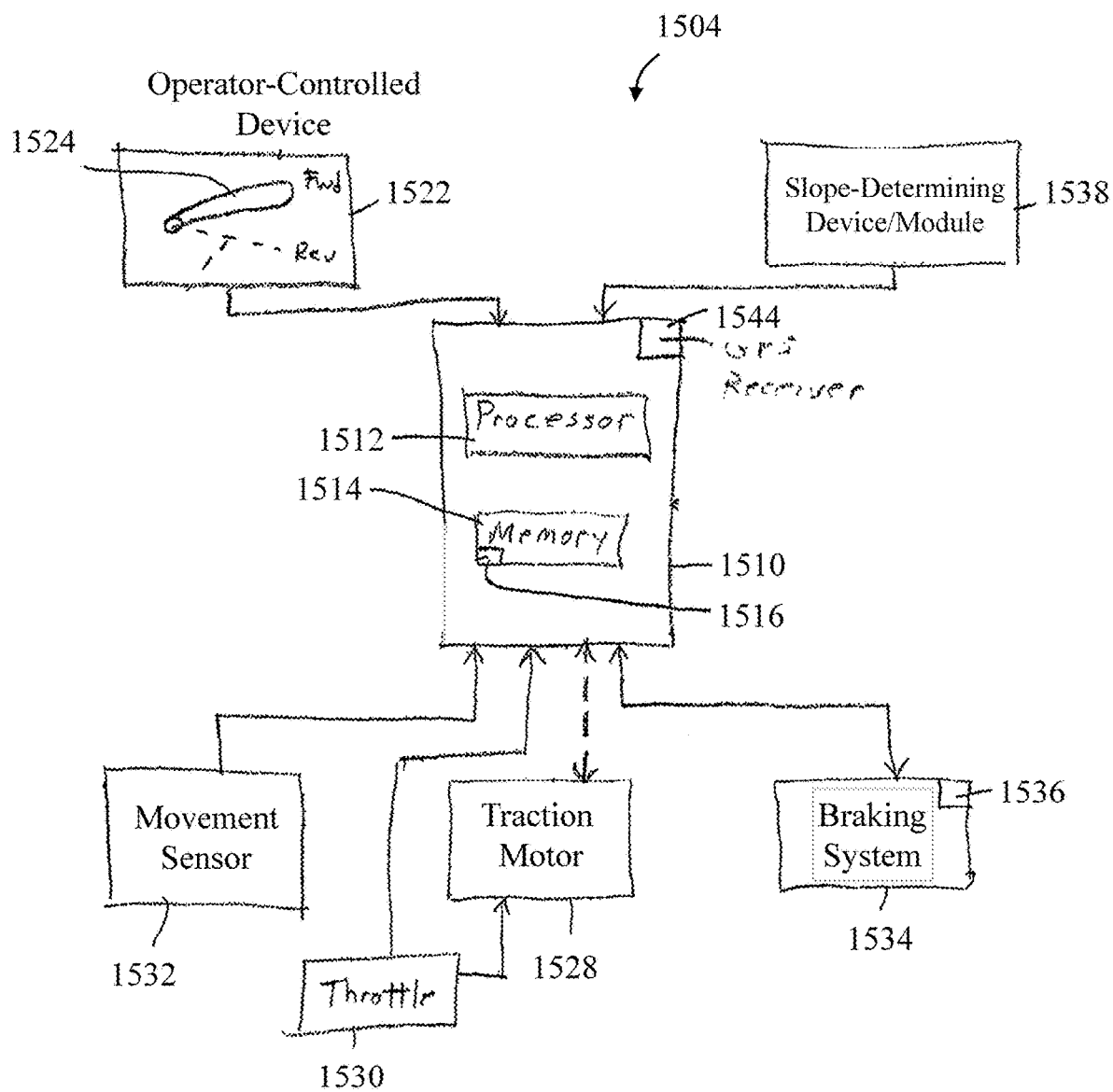
FIG. 16 is a schematic view of a control system of the vehicle system shown in FIG. 15.

With reference to FIGS. 15 and 16, the vehicle 1504 can include a controller 1510, such as an LCM or one or more of the other controllers described herein. The controller 1510 includes one or more processors 1512 and a memory 1514. The memory 1514 may include, among other things, a route database 1516 having data regarding the route 1540. For example, the route database 1516 may include data regarding a slope or grade of the route 1540 and whether the slope is uphill or downhill based on direction of movement along the route 1540. As shown in FIG. 15, the slope or grade for the direction of travel 1508 is positive or ascending (e.g., uphill).

The controller 1510 can receive and store a variety of inputs for determining how to control the performance of the vehicle system 1502. For example, the controller 1510 may use at least one of the selected travel direction (or the selected direction of travel), the grade of the route 1540, the tractive efforts, or the braking efforts for its decision-making algorithms or processes. One such algorithm or process may be for determining a direction of movement. For example, the controller 1510 can determine the direction of movement based on the selected travel direction and the grade of the route 1540 and at least one of the tractive efforts or the braking efforts. In particular embodiments, the controller 1510 can determine the direction of movement when the vehicle system 1502 is at a stopped position or at nearly stopped position. The vehicle system may be at a nearly stopped position when the vehicle system 1502 is slowly moving. For example, a vehicle system may be slowly moving if the vehicle system is moving no faster than 5 miles/hour (mph) or 8 kilometers/hour (kph), or in another embodiment, no faster than 2 mph (or 3.2 kph), or in a more particular embodiment, no faster than 1 mph (or 1.6 kph). The vehicle system may be at a nearly stopped position as the vehicle system decelerates while ascending a slope or as the vehicle system accelerates while descending a slope.

The direction-of-movement determination may be initiated by the controller 1510 in response to a triggering event, such as when a brake is released or movement is initiated. In some embodiments, the triggering event is actual movement of the vehicle system 1502 being detected. The direction of movement may be determined based on the selected travel direction, the grade of the route 1540, and the forces experienced by the vehicle system 1502. The forces experienced by the vehicle system 1502 include gravity, tractive efforts (e.g., generated by one or more motors), and braking efforts (generated by a braking system or dynamic braking). The forces generated by gravity can be a function of the grade, the total weight of the vehicle system 1502, and a distribution of the weight along the vehicle system 1502.

The selected travel direction can be determined by an operator-controlled device 1522, such as a reverser. For example, the operator-controlled device 1522 may communicate an input to the controller 1510 based on a setting of the device 1522. This input may identify or correspond to the selected travel direction. For embodiments in which the operator-controlled device 1522 is a reverser, the input may be determined by whether a reverser handle 1522 is in a forward position, a neutral position, or a reverse (or rearward) position. By way of example, a forward position of the reverser handle 1522 could indicate that the selected travel direction 1508 is uphill as shown in FIG. 15. Alternatively, a rearward position of the reverser handle 1522 could indicate that the selected travel direction is downhill.

As shown in FIG. 16, the vehicle 1504 can also include a traction motor 1528 which, under the control of the controller 1510, can propel the vehicle 1504 in a designated direction. The vehicle 1504 may include a throttle 1530 for controlling an amount of power applied by the traction motor 1528 to the, for example, wheels of the vehicle 1504. In an example, the controller 1510 can be programmed or configured to detect the position or setting of throttle 1530 and to convert said position or setting to an amount of power to be applied by the traction motor 1528 to the wheels of the vehicle 1504. In another example, the controller 1510 can be programmed or configured to convert one or more inputs (voltage and/or current) to the traction motor 1528 into the power being applied or delivered by the traction motor 1528. In another example, the amount of power being applied by the traction motor 1528 can be determined from an output of the traction motor 1528, e.g., horsepower=torque x angular velocity.

The vehicle 1504 may also include a movement sensor 1532, such as a rotational sensor (e.g., tachometer). The movement sensor 1532 can provide an input to the controller 1510 indicating whether a rotatable part of the vehicle system 1502 is moving. For example, the movement sensor 1532 may provide an input that indicates whether a wheel or axle is moving and how fast. The controller 1510 can also receive an input from a brake sensor 1536 of the vehicle system 1502. The input may identify a setting of the braking system 1534, such as whether the braking system 1536 is fully applied or only partially. For example, the braking system may be set between 0% and 100% braking. In some embodiments, the braking sensor 1536 can include a pressure gauge that communicates to the controller 1510 a signal indicative of the air pressure in a brake pipe of the vehicle system 1502.

The vehicle 1504 can also include a slope-determining device or module 1538. The slope-determining circuit 1538 may be in addition to or as an alternative to slope or grade data included in route database 1516. For example, the slope-determining device 1538 can be an accelerometer or an electronic level which can communicate an input to the controller 1510 that is indicative of a slope or grade (e.g., positive or negative) for where the vehicle system 1502 is currently positioned. Based on the slope where the vehicle system 1502 presently resides and the selected travel direction of the vehicle system 1502, the controller 1510 can be programmed or configured to determine whether the vehicle system 1502 is poised to travel uphill or downhill (or to ascend or descend). The controller 1510 can determine, prior to the vehicle system 1502 coming to a stop on the route 1540, that the direction of travel 1508 of the vehicle system 1502 is in an uphill direction.

In some non-limiting embodiments or examples, the controller 1510 can be programmed or configured to determine the slope of the route 1540 where the vehicle system 1502 is presently located from slope data included in route database 1516 and/or from the output of slope-determining device 30, if provided, and the selected direction of travel of the vehicle system 1502 from the setting of reverser device 1522, e.g., forward 24. Based on the thus determined slope of the route 1540 and the setting of reverser device 1522 to forward 24, the controller 1510 can be programmed or configured to determine that the forward the direction of travel 1508 of the vehicle system 1502 is uphill.

Moreover, the controller 1510 can determine from the setting of throttle 1530, and/or from the output of the traction motor 1528, and/or from one or more electrical inputs to the traction motor 1528, the tractive efforts being applied for the vehicle system 1502. If the tractive efforts applied by the traction motors 1528 for moving the vehicle system 1502 uphill are greater than the forces generated by gravity acting on the vehicle system 1502, then the controller 1510 can be programmed or configured to declare or communicate that the vehicle system 1502 is moving uphill in the forward direction of travel 1508.

Figure 17:
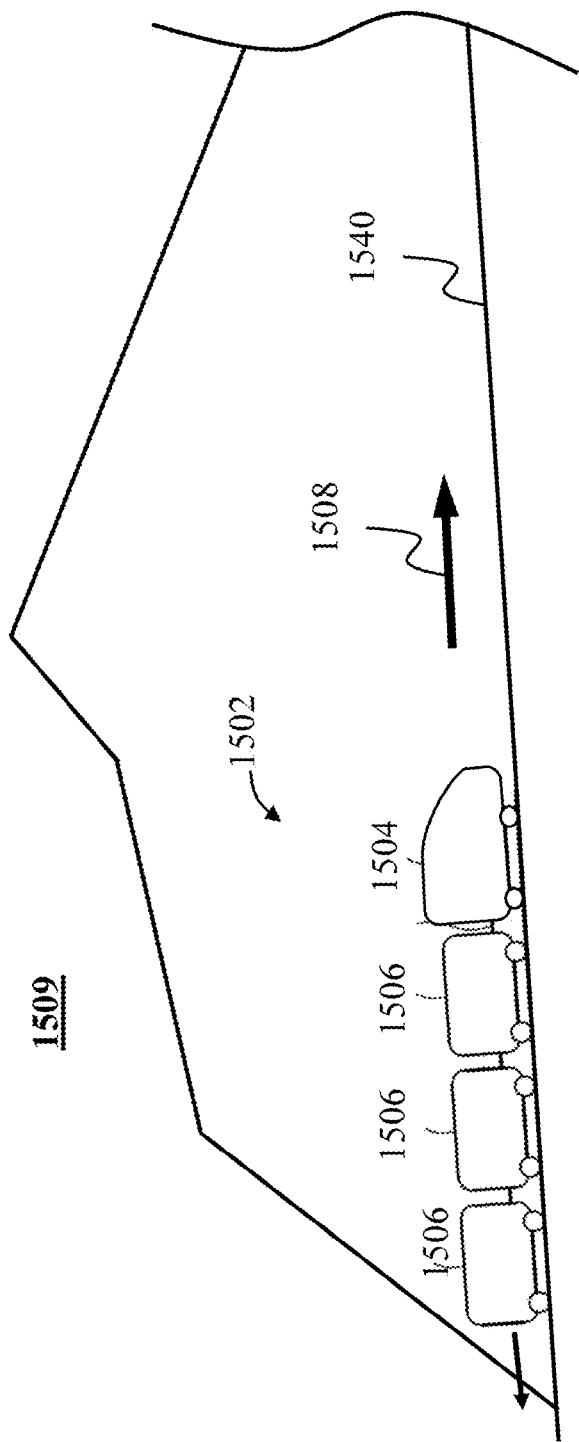
FIG. 17 is a schematic view of the vehicle system of FIG. 15 moving downhill from the stopped position.

FIG. 17 is another schematic illustration of the vehicle system 1502 shown in FIG. 15. In FIG. 17, the vehicle system 1502 is moving downhill with the brakes released and without any tractive efforts being applied. The selected travel direction is forward (or uphill). Prior to moving downhill, the vehicle system 1502 was driven uphill in the forward direction and came to a complete stop. The vehicle system 1502 may be stopped by controlling the setting of the throttle 1530 to reduce the power output of the traction motor 1528 so that forces driving the vehicle system uphill are less than the force of gravity acting to pull the vehicle system 1502 downhill. The vehicle system 1502 may also be stopped by applying braking efforts with the braking system 1534.

In regions where the GPS coverage is insufficient, it is possible that the vehicle system 1502 may begin to move downhill in a direction that is opposite the selected travel direction. Under these circumstances, the movement sensor 1532 will communicate to the controller 1510 that the vehicle system 1502 is moving. However, the movement sensor 1532 may not be able to communicate the direction in which the vehicle system 1502 is moving. When the actual travel direction of the vehicle system 1502 is opposite (or reverse) the selected travel direction, it may be desirable to update a stored variable in the control system that represents the direction of travel. More specifically, it may be desirable to change the selected travel direction from one direction to its opposite direction. Various processes used by the controller or the vehicle system in general, such as automated driving or navigation processes, may use the stored variable in its decision-making.

In some embodiments, the stored variable representing the selected travel direction may be changed in response to the controller 1510 determining that the force of gravity acting on the vehicle system 1502 in the downhill direction is greater than the amount of power applied by the traction motor 1528 urging the vehicle system 1502 to move in the uphill direction. Alternatively or additionally, the stored variable representing the selected travel direction may be changed in response to the controller 1510 determining that the setting of the braking system 1534 is insufficient for holding the vehicle system at the stopped position. In this example, the direction of travel variable stored in the controller 1510 can be updated from forward to reverse, whereupon the controller 1510 can safely control the navigation of the vehicle system 1502 moving downhill, including controlling the braking system 1534 and/or controlling the power output of traction motor 1528 to slow or stop the vehicle system 1502 from moving downhill and, optionally, begin moving the vehicle system 1502 uphill. In some non-limiting embodiments or examples, the force of gravity acting on the vehicle system 1502 can be determined based on Newton's Second Law of Motion, namely, F=ma, where F is the force of gravity, "m" is the mass of the vehicle system 1502, and "a" is the acceleration due to gravity, i.e., about 9.8 m/s2. The mass of the vehicle system 1502 can be determined and input into the controller 1510 in any suitable and/or desirable manner based on the mass of the vehicle 1504 and the mass of any cars 6 comprising the vehicle system 1502.

The setting of the braking system 1534, from 0% to 100% braking, can be converted by the controller 1510 into a force applied by the braking system 1534 in a direction opposite the force of gravity acting on the vehicle system 1502 based on Newton's Second Law of Motion described above. For example, in order to prevent the vehicle system 1502 from traveling downhill when motor 1528 is not being powered to urge the vehicle system 1502 uphill, the force applied by the braking system 1534 must, at least, equal the force of gravity acting on the vehicle system 1502. Between this force and 0% braking, the force applied by the braking system 1534 can be estimated by the controller 1510 for the grade or slope of the route 1540 where the vehicle system 1502 is presently located. In this example, the contribution of the setting of braking system 1534 to counteract the force of gravity acting to pull the vehicle system 1502 downhill can be considered by the controller 1510 where determining if the vehicle system 1502 is traveling uphill or downhill.

Figure 18:
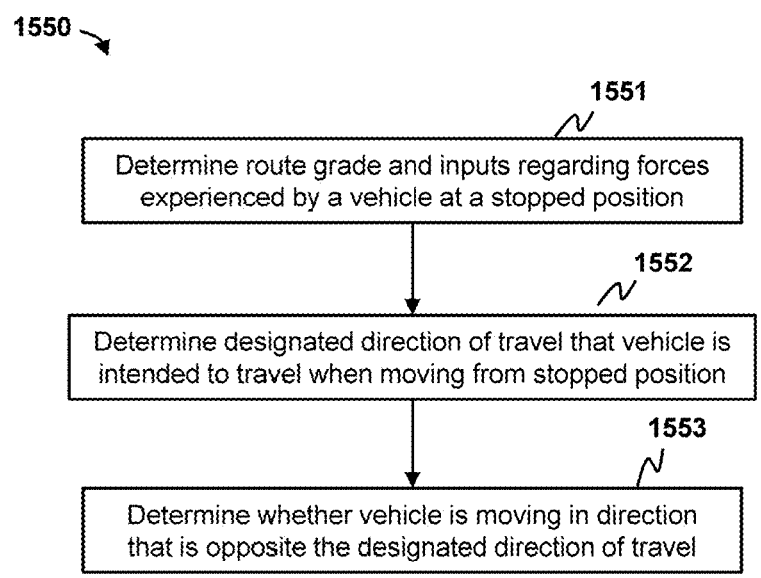
FIG. 18 illustrates a flowchart of one embodiment of a method for determining a direction of movement of a vehicle from a stopped position on a grade.

FIG. 18 is a flowchart illustrating a method 1550 for determining a direction of movement in accordance with one embodiment. At 1551, various inputs may be received for determining the direction of movement. It is not necessary for the inputs to be received concurrently or around the same time. For example, one input may be received and stored for the entirety of the trip (e.g., weight of vehicle system) while other inputs may be monitored and frequently updated (e.g., power applied by traction motors). By way of example, the controller 1510 may receive a selected travel direction, a route grade for where the vehicle is located, and inputs regarding forces experienced by the vehicle at the stopped position. The grade or slope of the route 1540 where the vehicle system 1502 is presently located may be identified by the route database 1516 or the slope-determining device 1538 (e.g., an accelerometer, an electronic level, etc.). The controller 1510 can also receive as input an amount of power applied by the traction motor 1528 and/or the setting of the vehicle system braking system 1534 to fully or partially on or off via brake setting sensor 1536. The controller 1510 can receive input regarding rotation of a wheel of the vehicle system 1502 from movement sensor 1532.

At 1552, the controller 1510 can determine a designated direction that the vehicle is configured to travel (or intended to travel) when the vehicle moves from a stopped positioned. The designated direction may be determined based on the selected travel direction and, optionally, the grade of the route where the vehicle is located. In some embodiments, the controller 1510 may also confirm or verify the designated direction based on the tractive efforts being applied (e.g., an amount of power being applied by the traction motors 1528). For example, the designated direction can be confirmed if the amount of power moving the vehicle in the designated direction is greater than forces pulling the vehicle in the opposite direction. The designated direction can also be confirmed based on GPS data. More specifically, prior to entering an area with poor GPS coverage or no GPS coverage, the GPS data may indicate that the vehicle is moving in the designated direction.

At 1553, the controller 1510 can determine whether movement from the stopped position is in the designated direction. For example, when it is desired to commence movement of the vehicle system 1502 after stopping on the slope, the traction motor 1528 can be controlled to apply power to the wheels of the vehicle 1504. The controller 1510 will determine that the vehicle is moving downhill if the power applied by the traction motors 1528 is insufficient to cause the vehicle system 1502 to move uphill and/or if the setting of braking system 1534 is insufficient to hold the vehicle at the stopped position. Using trains as an example, if the wheels of the vehicle system are determined to be rotating but the power applied by the traction motors 1528 are insufficient to cause the vehicle system to move uphill against the force of gravity and if the braking system 1534 is not sufficient to avoid or prevent the wheels of the vehicle system 1502 from moving, then controller 1510 will determine that the vehicle system 1502 is traveling downhill. Responsive to determining that the vehicle system 1502 is moving downhill, the controller 1510 can set the direction of travel variable stored in the controller 1510 from forward to reverse, whereupon a navigation system, implemented at least in part by software run by the controller 1510, can navigate the vehicle system 1502 traveling downhill.

In some embodiments, the automated control of the vehicle system 1502 under a navigation system can include the controller 1510 controlling the power applied by the traction motors 1528 while having the operator-controlled device 1522 set to a forward position and/or the braking system 1534 being fully or partially applied. In an example, if the force or power applied by the traction motor 1528 is sufficient to cause the vehicle system 1502 traveling in reverse in the downhill direction to change direction and begin moving forward in the uphill direction then it may not be necessary for the controller 1510 to set the braking system at a partial brake setting or a full brake setting. On the other hand, if the vehicle system continues to move downhill after applying power from the traction motors, the controller 1510 can be programmed or configured to control the braking system 1534 to be set fully or to be partially set to slow and/or stop the movement of the vehicle system 1502 traveling downhill.

Regarding the inputs used by the controller 1510 for determining the direction of movement, the operator-controlled device 1522 can be utilized to set the selected travel direction in some embodiments. For example, the operator-controlled device 1522 can include a reverser handle that is positionable in forward or reverser. The grade of the route can be retrieved by the controller 1510 from the route database 1516. The grade of the route may be based on the direction of travel. Also or alternatively, the grade of the route can be input into the controller 1510 from a slope-determining device, e.g. an accelerometer or an electronic level. The tractive efforts can be determined by the throttle 1530. More specifically, the throttle 1530 can be used to set the amount of power or force applied by the traction motors 1528 to the wheels of the vehicle 1504. The amount of power or force applied can be determined from one or more inputs into the traction motor 1528 (e.g., voltage and current) and/or from the power output by the traction motor 1528, e.g., horsepower=torque x angular velocity. When the force applied by the traction motor 1528 urging the vehicle system 1502 uphill is greater than the force of gravity urging the vehicle system 1502 downhill, the vehicle system 1502 will move uphill. Conversely, if the force of gravity urging the vehicle system 1502 in downhill is greater than the force applied by the traction motor 1528 to move the vehicle system 1502 uphill, the vehicle system 1502 will travel downhill. Full or partial application of braking system 1534 can be utilized to control or stop the descent of train in the downhill direction. The rotation of the wheel can be determined by movement sensor 1532.

Figure 19:
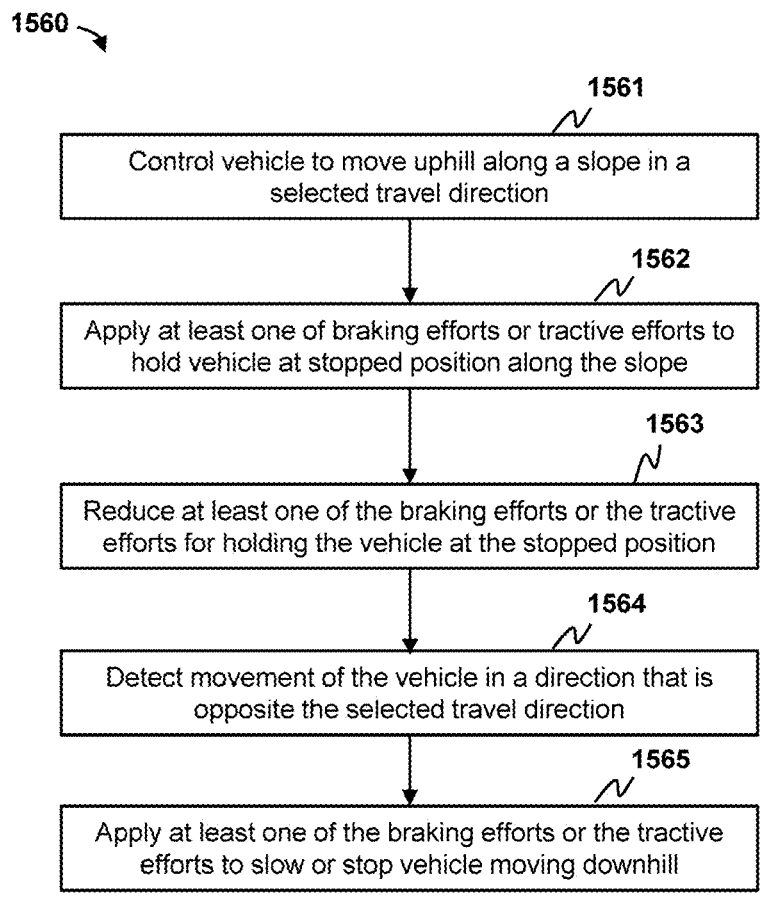
FIG. 19 illustrates a flowchart of one embodiment of a method for controlling vehicle movement on a grade.

FIG. 19 is a flowchart illustrating a method 1560 of controlling a vehicle system in accordance with one embodiment. At 1561, a vehicle system having a selected forward travel direction is controlled to move uphill on a slope. At 1562, the braking system is controlled to hold the vehicle system at a stopped position on the slope. Alternatively or in addition to the braking system, one or more traction motors may apply power to hold the vehicle system in the stopped position. At 1563, one or more brakes of the braking system can be released and/or the tractive efforts can be reduced, thereby allowing the vehicle system to move. At 1564, the controller 1510 can determine that the vehicle system is moving in a direction that is opposite the selected direction of travel. For example, the vehicle system may be moving downhill when the selected travel direction is uphill, as determined by the operator-controlled device having a forward setting. At 1565, the controller 1510 can control the braking system to slow or stop the vehicle system from moving downhill (in a reverse travel direction) and/or the controller 1510 can control a traction motor of the vehicle system to increase the power applied by the traction motor to urge the vehicle system to move in the forward direction uphill on the slope or, in other words, against the forces pulling the vehicle system downhill.

In some embodiments, the controller 1510 may determine, at 1564, that the vehicle system is moving in a direction that is opposite the selected direction of travel by determining one or more of the following. The controller 510 may determine that an actual acceleration of the vehicle system is greater than a predetermined acceleration. Alternatively or in addition to the above, the controller 510 may determine that a power applied by the traction motor of the vehicle system is less than the power needed to move the vehicle system uphill in the forward direction over the force of gravity acting on the vehicle system. Alternatively or in addition to one or more of the above, the controller 510 may also determine that a brake setting of the braking system is less than the brake setting needed to stop the vehicle system when the wheel of the vehicle system is determined to be rotating. Responsive to determining one or more of the above, the controller 1510 may determine that the vehicle system is moving in a direction that is opposite the designated travel direction.

In another example, the controller 1510, at 1564, can include determining movement of the vehicle system based on the output of the movement sensor 1532. In another example, the controller 1510, at 1561, can include determining the forward travel direction uphill on the slope based on movement of the vehicle system and at least one of the following: a route database that can include slope data of a path of the vehicle system is presently located and/or an output of an electronic slope-determining device.

For some embodiments, at least one technical effect may include the ability to determine if the vehicle system 1502 is moving in the direction opposite the selected travel direction. If the vehicle system 1502 is moving in the direction opposite the selected travel direction, the controller 510 can update the direction of travel variable accordingly. With the direction of travel variable updated to reflect the actual direction of travel of the vehicle system 1502, the navigation of the vehicle system 1502 traveling downhill when the operator-controlled device 1522 is set to the forward position can be better managed and/or controlled by the controller 1510 thereby avoiding potential safety hazards.

While some of the above examples have been described with reference to the vehicle system 1502 having a selected direction of travel set to forward for moving uphill a slope, it is envisioned that embodiments may be practiced by the vehicle system 1502 having a selected direction of travel set to reverse and moving in reverse on a slope uphill. In this example, the force of gravity acting on the vehicle system 1502 would urge the vehicle system 1502 to move in a forward direction downhill.

In accordance with one embodiment, a system is provided that can include a controller configured to determine a direction of movement of a vehicle in response to a brake being released or in response to initiating movement of the vehicle from a stopped position along a route. The direction of movement can be determined based on a selected travel direction of the vehicle (e.g., selected by a human operator or autonomously selected by the controller), a grade of the route, and at least one of applied tractive efforts or applied braking efforts.

In some aspects, the direction of movement can be determined after calculating whether the at least one applied tractive efforts or applied braking efforts are sufficient for moving the vehicle in the selected travel direction along the route.

In some aspects, in response to determining that the direction of movement is not the selected travel direction, the controller can be further configured to control at least one of a braking system or one or more motors of the vehicle to change the direction of movement.

In some aspects, when the vehicle is stopped along the route at the stopped position, the controller can be further configured to determine whether the selected travel direction is uphill based on the selected travel direction, the grade of the route where the vehicle is in the stopped positioned, and at least one of tractive efforts or braking efforts that hold the vehicle at the stopped position.

In some aspects, the controller can be configured to determine the direction of movement after the brake is released and in response to detecting rotation of a rotating part of the vehicle (e.g., a wheel or axle).

In some aspects, the selected travel direction can be determined by an operator-controlled device. The operator-controlled device may control a physical mechanism that affects movement of the vehicle. The selected travel direction can be determined by one of a plurality of potential device settings of the operator-controlled device. The selected travel direction can be communicated to the controller by the operator-controlled device or manually input by the operator. Optionally, the operator-controlled device can include a reverser having at least a forward position and a reverse position.

In some aspects, the grade of the route can be determined by at least one of an on-board sensor that detects the grade or an on-board database.

In some aspects, the system may also include a tachometer that communicates movement of a wheel of the vehicle.

In accordance with one embodiment, a method is provided that includes receiving a selected travel direction of a vehicle along a route, a grade of the route, and at least one of applied tractive efforts or applied braking efforts. The method also includes determining a direction of movement of the vehicle along the route in response to a brake being released or in response to initiating movement of the vehicle from a stopped position along the route.

In some aspects, the method can also include determining whether the at least one applied tractive efforts or applied braking efforts are sufficient for moving the vehicle in the selected travel direction along the route. The direction of movement can be in the selected travel direction if the at least one applied tractive efforts or applied braking efforts are sufficient for moving the vehicle.

In some aspects, in response to determining that the direction of movement is not the selected travel direction, the method can also include controlling at least one of a braking system or one or more motors of the vehicle to change the direction of movement.

In some aspects, when the vehicle is stopped along the route at the stopped position, the method can also include determining whether the selected travel direction is uphill based on the selected travel direction, the grade of the route where the vehicle is in the stopped positioned, and at least one of tractive efforts or braking efforts that hold the vehicle at the stopped position.

In some aspects, the direction of movement can be determined after the brake is released and in response to detecting rotation of a rotating part of the vehicle.

In some aspects, the selected travel direction can be determined by an operator-controlled device. The operator-controlled device can control a physical mechanism that affects movement of the vehicle. The selected travel direction can be determined by one of a plurality of potential device settings of the operator-controlled device.

In some aspects, the operator-controlled device can include a reverser having at least a forward position and a reverse position.

In some aspects, the grade of the route can be determined by at least one of an on-board sensor that detects the grade or an on-board database.

In some aspects, a tachometer communicates movement of a wheel of the vehicle.

In some aspects, the method can also include causing the vehicle to ascend along the route in the selected travel direction. The method can also include causing at least one of the applied braking efforts or the applied tractive efforts to hold the vehicle at the stopped position along the route. The method can also include releasing the at least one applied braking efforts or the applied tractive efforts.

In some aspects, the method can also include detecting that a wheel of the vehicle is rotating and determining that the vehicle is moving downhill along the route when the selected travel direction is for moving uphill along the route. The method can also include applying at least one of braking efforts or tractive efforts to slow or stop the vehicle moving downhill.

In accordance with one embodiment, a method is provided that can include: (a) receiving, by a controller comprising a processor and memory, input regarding: a selected travel direction of a train; a grade of a route where the vehicle system is presently located; an amount of power applied by a motor of the vehicle system; a setting of brakes of the vehicle system fully or partially on or off; and rotation of a wheel of the vehicle system; (b) determining, by the controller when the vehicle system is stopped, based on the selected travel direction of the vehicle system and the grade of the route where the vehicle system is stopped, and/or the setting of the brakes (e.g., without limitation, amount or percent of braking) required to maintain the vehicle system stopped, that a travel direction of the vehicle system is uphill; and (c) determining, by the controller, when the wheel of the vehicle system is determined by the controller to be rotating, based on the amount of power applied by the traction motor of the vehicle system being insufficient to cause the vehicle system travel uphill and/or the setting of the brakes of the vehicle system (e.g., without limitation, amount or percent of braking), that the vehicle system is moving downhill.

In some aspects, the method can also include, based on the determination in step (c): (d) controlling, by the controller, the amount of power applied by the traction motor and/or the setting of the brakes of the vehicle system fully or partially on to control movement of the vehicle system moving downhill or to cause the vehicle system to travel uphill.

In some aspects, step (d) can include at least one of the following: the amount of power applied by the traction motor causing the vehicle system to travel uphill; and the brakes of the vehicle system being set to slow or stop the vehicle system moving downhill.

In some aspects, step (c) can include the controller navigating the vehicle system moving downhill.

In some aspects, the selected travel direction is set by a reverser handle.

In some aspects, the grade of the route is input to the controller from a route database accessible to the controller.

In some aspects, the grade of the route is input to the controller from a slope-determining device.

In some aspects, the slope-determining device is at least one of an accelerometer or an electronic level.

In some aspects, a throttle sets the amount of power applied by a motor of the vehicle system.

In some aspects, the setting of the brakes in step (c) is partially on or off.

In some aspects, the rotation of the wheel is determined by a wheel tachometer sensor.

In some aspects, the method can also include, based on the determination in step (c): controlling, by the controller, movement of the vehicle system downhill when the selected travel direction is uphill by controlling at least one of the following: the amount of power applied by the traction motor and the setting of the brakes of the vehicle system to fully or partially on; or controlling, by the controller, at least one of the following: the amount of power applied by the traction motor and/or the setting of the brakes of the vehicle system to fully or partially on to change the travel direction of the vehicle system from the reverse travel direction to the forward travel direction.

In some aspects, the determination in step (c) is further based on an acceleration of the vehicle system being greater than a predetermined acceleration of the vehicle system.

In some aspects, the predetermined acceleration of the vehicle system is a predicted acceleration of the vehicle system from a stop in the uphill direction.

In some aspects, wherein the vehicle system comprises a locomotive and one or more cars.

In some aspects, wherein step (c) can include the traction motor applying no power and the brakes of the vehicle system being off.

In accordance with one embodiment, the method can include (a) causing a train, having a selected direction to move to move the vehicle system uphill on the slope, to move uphill on the slope; (b) following step (a), causing brakes of the vehicle system to stop the vehicle system on the slope; (c) following step (b), releasing the brakes of the vehicle system; (d) following step (c), determining, by a controller, that the vehicle system is moving downhill on the slope when the selected direction of travel is set to move the vehicle system uphill on the slope; and (e) in response to step (d), causing, by the controller, at least one of the following: the brakes of the vehicle system to be set to slow or stop the vehicle system moving downhill; and/or a motor of the vehicle system increasing a power applied by the traction motor to urge the vehicle system to move uphill on the slope.

In some aspects, step (d) can include at least one of the following: an actual acceleration of the vehicle system being greater than a predetermined acceleration; a power applied by a motor of the vehicle system being less than that needed to move the vehicle system uphill over a force of gravity acting to move the vehicle system downhill; and a level of setting of the brakes of the vehicle system being less than that needed to stop the vehicle system when a wheel of the vehicle system is determined to be rotating.

In some aspects, in step (d), movement of the vehicle system is determined based on an output a wheel tachometer sensor.

In some aspects, movement of the vehicle systems uphill on the slope is determined by the controller based on movement of the vehicle system in step (a) and at least one of the following: a route database that can include slope data of a path where the vehicle system is presently located; and an output of an electronic slope-determining device.

As described herein, embodiments may be implemented by one or more processors that are configured to execute one or more sets of instructions stored in memory (e.g., one or more computer-readable mediums). The set of instructions may include various commands that instruct the computer or processor as a processing machine to perform specific operations such as the methods and processes described herein. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine. The program may be compiled to run on, for example, a 32-bit, 64-bit, or 132-bit and 64-bit operating systems.

As used herein, the terms "software" and "firmware" are interchangeable and include any computer program stored in memory for execution by a processor or other logic-based device. The computer program may be in the form of a computer program code written in any of the known computer languages containing instructions embodied in a computer-readable medium (e.g., a tangible and non-transitory computer readable storage medium), such as RAM memory, ROM memory, EPROM memory, EEPROM memory, and non-volatile RAM (NVRAM) memory. Computer-readable medium may also include floppy diskettes, CD-ROM's, hard drives, DVD's, solid state drive, removable media, and the like. The above memory types are exemplary only and are thus not limiting as to the types of memory usable for storage of a computer program.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device, and/or a memory device. Such instructions, when executed by a processor, cause the processor to perform at least a portion of the methods described herein. As such, the term can include tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed:

1. A vehicle control system comprising:
a controller configured to determine a speed of a vehicle, a route grade, a payload weight, and an accelerator pedal position, wherein the controller is configured to identify a maximum deceleration rate of the vehicle based on the route grade, the payload weight, and the accelerator pedal position; and
wherein the controller also is configured to automatically slow or stop movement of the vehicle by automatically actuating a brake of the vehicle responsive to the maximum deceleration rate of the vehicle being identified and an operational speed of a traction motor provided on the vehicle exceeding a designated, non-zero speed threshold.

2. The vehicle control system of claim 1, wherein the controller is configured to automatically control an applied torque to maintain vehicle deceleration to less than the maximum deceleration rate.

3. The vehicle control system of claim 1, wherein the controller is configured to determine the route grade using at least one of a slope-determining device that detects the route grade or an on-board database having the route grade stored therein.

4. The vehicle control system of claim 1, further comprising a tachometer that detects movement of a wheel of the vehicle and communicates the movement to the controller.

* * * * *